United States Patent
Staddon et al.

(10) Patent No.: US 7,363,244 B2
(45) Date of Patent: Apr. 22, 2008

(54) METHODS, APPARATUS, AND PROGRAM PRODUCTS FOR INFERRING SERVICE USAGE

(75) Inventors: Jessica N. Staddon, Redwood City, CA (US); Robert T. Johnson, Berkeley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 782 days.

(21) Appl. No.: 10/290,634

(22) Filed: Nov. 8, 2002

(65) Prior Publication Data

US 2004/0103066 A1    May 27, 2004

(51) Int. Cl.
G06F 11/34 (2006.01)
G06F 17/00 (2006.01)
H04K 1/00 (2006.01)
H04L 9/00 (2006.01)

(52) U.S. Cl. .................... 705/11; 705/80; 705/404; 713/168

(58) Field of Classification Search ............ 705/80, 705/11, 404, 405; 713/168
See application file for complete search history.

(56) References Cited

U.S. PATENT DOCUMENTS

| 6,055,508 | A * | 4/2000 | Naor et al. ............ 705/11 |
| 7,136,860 | B2 * | 11/2006 | Doliov ................ 707/101 |
| 2003/0088645 | A1 * | 5/2003 | Ferraro ............... 709/218 |
| 2007/0113274 | A1 * | 5/2007 | Hariharan et al. ....... 726/13 |

OTHER PUBLICATIONS

Barbara Masucci and Douglas R. Stinson, Efficient Metering Schemes With Pricing, IEEE Transactions On Information Theory, vol. 47, No. 7, Nov. 2001.*

Fan, Li et al. "Summary Cache: A Scalable Wide-Area Web Cache Sharing Protocol," 1998, section on Bloom Filters—the Math, printed from http://www.cs.wisc.edu/~cao/papers/summary-cache/node8.html.

Hardy, Norman "A Little Bloom Filter Theory (anda Bag of Filter Tricks)," 1999, printed from http://cap-lore.com/code/BloomTheory.html.

Ripeanu, Matei and Adriana Iamnitchi, "Bloom Filters—Short Tutorial," Sep. 2001, printed from http://people.cs.uchicago.edu/~matei/PAPERS/.

"Web Caching with Dynamic Content Seminar," 2000, printed from http://www.beachsoftware.com/bloom/index.html.

"Web Caching with Dynamic Content Seminar—White Paper," 2000, printed from http://www.beachsoftware.com/bloom/white_paper.html.

* cited by examiner

*Primary Examiner*—Andrew J. Fischer
*Assistant Examiner*—Charlie C. L. Agwumezie
(74) *Attorney, Agent, or Firm*—Park, Vaughn & Fleming LLP

(57) ABSTRACT

Given the recent changes in the policy governing Internet content distribution, such as the institution of per listener royalties for Internet radio broadcasters, content distributors now have an incentive to under-report the size of their audience. Previous audience measurement schemes only protect against inflation of audience size. We present the first protocols for audience measurement that protect against both inflation and deflation attempts by content distributors. The protocols trade-off the amount of additional information the service providers must distribute to facilitate audience inference with the amount of infrastructure required and are applicable to Internet radio, web plagiarism, and software license enforcement. The protocols can be applied to other situations, such as auditing website screen scrapers and per-seat licensed software installations.

35 Claims, 18 Drawing Sheets

METHODS, APPARATUS, AND PROGRAM PRODUCTS FOR INFERRING SERVICE USAGE

CROSS REFERENCE TO RELATED APPLICATIONS

This application is related to U.S. patent application Ser. No. 10/291,310 filed Nov. 8, 2002, and the same title as above, filed concurrently herewith.

BACKGROUND OF THE INVENTION

1. Field of the Invention

This invention relates to the field of networked services.

2. Background

Internet service providers (for example, content distributors, such as web sites and radio stations, and Internet retailers) often want to prove to a third party that they have a large number of users, viewers or listeners (the audience or participants). Such information has historically been used to set advertising rates, so content distributors (in particular) have had an incentive to inflate these numbers. Various schemes for preventing content distributors from reporting artificially inflated audience sizes have been proposed (see for example: Moni Naor and Benny Pinkas, Secure and efficient metering, *Lecture Notes in Computer Science*, 1403:576-589, 1998; Matthew K. Franklin and Dahlia Malkhi, Auditable metering with lightweight security, *Financial Cryptography*, pages 151-160, 1997; and B. Masuci and D. R. Stinson, Efficient metering schemes with pricing, *IEEE Transactions on Information Theory*, 47:2835-2844, 2001; U.S. Pat. No. 6,055,508 to Naor et al., Method for secure accounting and auditing on a communications network; U.S. Pat. No. 6,389,538 to Gruse et al, System for tracking end-user electronic content usage; U.S. Pat. No. 6,418,467 to Schweitzer et al, Network accounting and billing system and method). With the advent of per-listener/viewer royalty fees for Internet radio and the growth of web content plagiarism, some service providers (such as the distributors listed above but also Internet merchants) now have an incentive to cheat by reporting artificially small audience/participant sizes and so to reduce the payments required to the content owner. None of the prior schemes for audience measurement detect such behavior.

Participant measurement protocols that are secure against deflation are necessary in many situations. These include, but are not limited to, Internet Radio/Video, Internet Software Distribution, and screen-scraping.

Internet Radio: The Internet has given rise to hobbyist Internet radio broadcasters which have (for example, stations have an average of less than one listener tuned in for 3 hours each day). These stations carry no advertisements and hence cannot afford to pay even the most modest of music royalties. Although some content owners may be willing to allow operation of such shoe-string operations, they are not willing to do so without some means of detecting when the station audience becomes significant.

Software Distribution: Often software owners arrange with content service providers to provide distribution services. The software owners cannot easily verify the number of times the software is provided by the distributor (thus requiring manual audits or just "trusting" the distributor). The software owner needs some inexpensive, low-overhead solution to determining the number of times their software has been provided.

Screen-Scraping: Websites that provide a useful service, such as Yahoo's real-time stock prices, often get "screen-scraped'" by other web services. The scraping service simply fetches the information from the original service, parses the desired data out of the returned web page, repackages it in a new format, and finally presents it to the client. The owner of the useful service needs to know how often their useful service is provided by the other web service.

In each of these cases (and many more) a service provider provides a service for which the service provider is obligated to pay a fee to the owner of the service (whether that service be content, access to resource, or access to functionality). It would be advantageous to allow the service owner to be able to anonymously and independently monitor the number of participants to whom the service provider provided the service.

SUMMARY OF THE INVENTION

Disclosed herein is a method for providing a service by a service provider. The service provider is responsive to one or more requests from one or more serviced clients. One of the serviced clients is an audit client. The service provider negotiates a tag for each request received from any of the serviced clients and for each request accumulates the tag with a lossy data representation of negotiated tags. The audit client seeds requests to the service provider and maintains audit client tag information representing the tags negotiated by the audit client with the service provider. The audit client then estimates a number of the requests serviced by the service provider from the lossy data representation of negotiated tags and the audit client tag information. One embodiment of a system for such a method includes the service provider, a negotiation mechanism, an accumulation mechanism, a seeding mechanism, and an estimation mechanism all interacting to perform the method.

Another embodiment of the invention is a method of providing a service responsive to a request that includes the steps of negotiating a tag for each request, accumulating the tag with a lossy data representation of negotiated tags, and providing the lossy data representation of negotiated tags. Such a service provider includes a network interface, a receiver mechanism, a negotiation mechanism, a tag accumulator mechanism and a transmission mechanism all interrelated to perform the method. Yet another embodiment of the invention is a program product that is configured to cause a computer to perform the method.

One embodiment of the invention is the auditor method. This method includes steps of seeding requests to a service provider, negotiating a tag for each request, maintaining audit client tag information representing the tags negotiated by the auditor, and of estimating the number of total requests serviced by the service provider from the lossy data representation of negotiated tags and the audit client tag information. The auditor apparatus for performing the method includes a network interface, a transmission mechanism, a negotiation mechanism, a tag storage mechanism, a reception mechanism, and an estimation mechanism all interrelated to perform the method. Yet another embodiment of the invention is a program product that is configured to cause a computer to perform the method.

The foregoing and many other aspects of the present invention will no doubt become obvious to those of ordinary skill in the art after having read the following detailed description of the embodiments that are illustrated in the various drawing figures.

DETAILED DESCRIPTION

Figure 1:
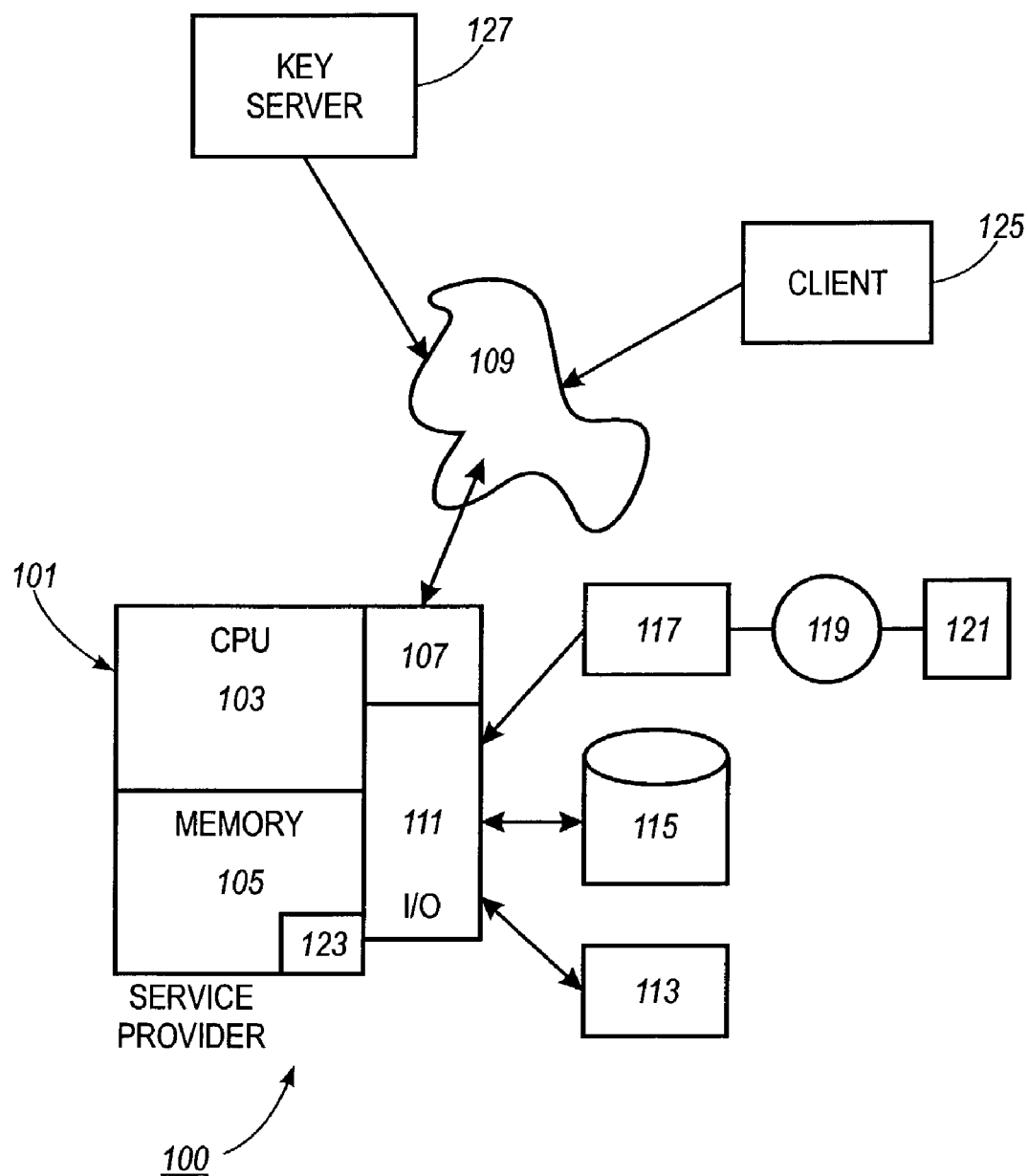
FIG. 1 illustrates a networked computer system in accordance with one embodiment.

FIG. 1 illustrates a networked computer system 100 that incorporates the invention. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable-media data device 117. The removable-media data device 117 can read a computer readable media 119 that typically contains a program product 121. The storage system 115 (along with the removable-media data device 117) and the computer readable media 119 comprise a file storage mechanism. The program product 121 on the computer readable media 119 is generally read into the memory 105 as a program 123. In addition, the program product 121 can be provided from the network (generally encoded with in an electromagnetic carrier wave—including light, radio, and electronic signaling) through the network interface 107. One skilled in the art will understand that a device in communication with the computer 101 can also be connected to the network 109 through the network interface 107 using the computer 101.

In this illustration, the computer 101 is configured to be a service provider that can provide content (such as may be stored on the file system in a database or otherwise) and/or services resulting from programs that are executed from the memory 105 by the CPU 103. The service provider provides its service to a client computer 125. In some embodiments, a key server computer 127 is also used.

One skilled in the art will understand that not all of the displayed features of the networked computer system 100 nor the computer 101 need to be present for the invention.

In this embodiment, the service provider is obligated to report the amount of usage of the service to the owner of the service.

The subsequent description of embodiments is presented assuming the context of "threads-of-execution", but one skilled in the art would understand that there exist many ways to implement the teachings herein that are equivalent to what is claimed. Each thread performs a number of procedures. A procedure being a self-consistent sequence of computerized steps that lead to a desired result. These steps can be defined by one or more computer instructions. These steps can be performed by a computer executing the instructions that define the steps. Thus, the term "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry designed to perform the steps.

One aspect of the invention allows an Internet service provider to prove the number of times the service is used (or the number of participants (the audience) who accessed (or joined) the service) to an auditor. Depending on the nature of the service provided, it may be appropriate to measure the number of client requests received during a given time interval, or it may be better to track the number of active clients (or streams, in unicast applications) during a given time period.

For example, web sites do not have a notion of streams, so the participant size is best measured by the number of requests from visitors each day. Radio stations could measure either the number of tune-ins per day or the number of active streams (which equals the number of current clients in a non-multicast environment) during each song. Regardless of what is measured, the service provider should not be able to significantly deflate the number of the times the service is provided.

It is also desirable that the auditor learn nothing about the audience members, i.e. they maintain their anonymity. So in summary, a scheme should:

Count either the current number of clients or the total number of requests (i.e. hit count).

Prevent content distributors from artificially deflating their audience size.

Preserve the anonymity of clients.

Be efficient.

Be easy to deploy.

In most of the scenarios that we consider, it makes sense to assume that the service providers and clients are aligned against the auditor. Thus, we cannot develop a protocol that enforces perfect compliance. To see why, observe that no matter how clever our protocol is, a service provider and a client can simply agree to ignore the protocol by conducting their transactions "under the table". There are a few possible defenses against this sort of attack:

- Create incentives for clients to enforce protocol compliance.
- Create incentives for the service providers to enforce compliance. In the case of hobbyist Internet radio broadcasters and the RIAA, granting legal immunity and waving royalty payments may be sufficient incentives to get micro-broadcasters to engage in one of these protocols.
- Monitor content distributor/client interactions to check for protocol compliance. The auditor cannot monitor every transaction but, on the relatively anonymous Internet, he can pose as a regular client. The auditor can then verify that the service provider obeys the protocol in a small number of randomly chosen transactions.

One aspect of the invention involves a combination of the last two methods. In traditional web metering schemes, each client of a service provider gives a token to the service provider. After the service provider has received enough tokens, it combines them (e.g. using a secret sharing scheme) and presents the result to an auditor. The service provider cannot forge tokens and hence cannot inflate the number of times the service is used (for example, an audience size). The service provider can obviously throw away tokens in order to appear to have a smaller audience. Under some aspects of the invention, the auditor poses anonymously as a client, giving the service provider some (undetectably) marked tokens. If the service provider tries to cheat by throwing away one of the marked tokens, it will be caught. Since the service provider cannot distinguish the marked tokens from regular ones, it cannot safely throw away any tokens, and hence cannot cheat.

Since our protocols require the auditor to pose as a regular client, these protocols are preferably implemented on a network that supports anonymous connections. Ideally, the underlying network would support perfect anonymity and unlinkability for all connections. The current Internet offers relative anonymity and, by virtue of dynamically assigned addresses and dial-up connections, relative unlinkability. Emerging peer-to-peer technologies may support perfect anonymity in the near future. Thus we analyze our protocols in the context of perfect anonymity. The protocols will degrade gracefully (in the sense that the protocol will still work, but that the service provider can more easily cheat) in the imperfect world of the current Internet. Some Digital Rights Management (DRM) applications may not offer perfect anonymity, since each client may have a fixed public/private key pair that it uses to communicate with content distributors. Note that this scenario doesn't preclude anonymity, just unlinkability. Both protocols described herein depend primarily on anonymity, not unlinkability, so they can still be used in DRM applications.

Aspects of the invention provide service owners with the ability to determine when a content provider has provided the service more times than has been authorized.

Another aspect of the invention provides service owners with the ability to determine a current audience size (or number of serviced clients that have joined to receive the service).

Yet another aspect of the invention allows the service owners to detect when the service provider is cheating (for example, by deflating the size of the audience or the number of joins).

The following discussion discloses the mathematical basis and implementations for the protocols that are the basis for the operation of embodiments of the invention.

A First Protocol for Inferring a Number of Participants

In a first embodiment the protocol is explained using Bloom filters. Briefly, a Bloom filter is a lossy representation of a set and consists of a bit-vector $\vec{b}$ of length m and s independent hash functions $h_1, \ldots, h_s:\{0,1\}^* \to N$ where m is called the width of the filter. The hash functions are used to map the universe of objects down to integers. Initially, $\vec{b}$ is all zeros. To insert an element x into the set represented by the Bloom filter $\vec{b}$, set the bits $\vec{b}[h_1(x) \bmod m] = \ldots = \vec{b}[h_s(x) \bmod m] = 1$ (if a bit is already set to 1 then no action is necessary). To test whether x is an element of the set represented by Bloom filter $\vec{b}$, test that $\vec{b}[h_1(x) \bmod m] = \ldots = \vec{b}[h_s(x) \bmod m] = 1$. Note that this test can lead to false positives; this is why the Bloom filter is termed "lossy". If $\vec{b}[h_i(x)] = 0$ for some i, then x cannot be in the set. Generally, Bloom filters do not support item removal.

Let $w(\vec{b})$ denote the Hamming weight of $\vec{b}$. The probability that a bit is 1 in a Bloom filter of width m after n insertions using s hash functions is $$1 - \left(1 - \frac{1}{m}\right)^{ns}.$$

So given a filter $\vec{b}$, we can estimate the number of insertions which have been performed on $\vec{b}$ by $$I(\vec{b}) = \frac{\ln(1 - w(\vec{b})/m)}{s \ln(1 - 1/m)}.$$

To minimize the probability of a false positive, s should be chosen so that $s = (\ln 2) m/n$, which gives a false positive rate of $$\left(\frac{1}{2}\right)^{(\ln 2) m/n} \approx (0.6185)^{m/n}.$$

So, for example, if m/n=8, the false positive rate using s=5 is 0.0216. Finally, if $b_1$ and $b_2$ are two Bloom filters of the same width, then we say $b_1 \leq b_2$ if $b_1[i] \leq b_2[i]$ for all i.

One embodiment of a system that uses the protocol is subsequently illustrated in FIG. 4. Each service provider maintains a Bloom filter of width m=cn, where n is the average number of requests seen by the service provider over some interval of time (for example, each week) and c is a parameter agreed upon in advance. In practice, c=8 works well. When a client sends a request to the service provider, the service provider and client engage in a coin flipping protocol to agree on an r bit nonce N and the service provider inserts N into the Bloom filter. Any standard coin flipping protocol will work. The parties then proceed with their normal protocols. After an interval of time (for example, each week) the service provider sends the Bloom filter $\vec{b}$ to the auditor and then starts again with a fresh filter.

The auditor checks that $\vec{b}$ has $w(\vec{b}) \le 2m/3$ and computes an estimate of the number of requests seen by the service provider via $$I(\vec{b}) = \frac{\ln(1 - w(\vec{b})/m)}{s\ln(1 - 1/m)}.$$

The requirement that $w(\vec{b}) \le 2m/3$ is a technical constraint necessary to guarantee that the estimate $I(\vec{b})$ is sufficiently accurate (see Theorem 1 below).

To audit the service provider for compliance, the auditor anonymously sends k requests to the service provider and then checks that all the auditor nonces, $N_1, \ldots, N_k$, are present in the Bloom filter that the service provider submits for that interval.

For service providers that have little participation (small audiences), this scheme is very efficient. Using the ratio m/n=8 mentioned above, the service provider must send the auditor about 1 byte per join. So, for example, a service provider that receives 20 requests each day would only have to send a 140 byte message to the auditor each week. Thus this scheme is completely feasible for small to medium service providers. Even a relatively large service provider with around 150 requests per day would only have to send a 1K weekly message to the auditor. In the context of Internet radio broadcasters, for example, these overheads are insignificant.

Using $I(\vec{b})$ as an estimate of the size of the service provider's audience gives good accuracy. The following theorem implies that if we use $I(\vec{b})$ as an estimate of the number of requests received by the service provider then, with extremely high probability, the actual number of requests will differ from our estimate by at most $\alpha\sqrt{m}$ for a small value of $\alpha$.

Theorem 1: Fix $$n_{max} < \frac{m\ln s}{s} \text{ and } W < \left(1 - \frac{1}{s}\right)m.$$

Let X be a random variable representing the set of nonces received by the service provider. We model X as taking on values at random from the set $\{\{x_1, \ldots, x_n\} | x_i \in Z/2^r Z, 0 \le n < n_{max}\}$. Let $\vec{B}[X]$ denote the Bloom filter representation of X, and $w(X) = w(\vec{B}[X])$. Then $$Pr[||X| - I(\vec{B}[X])| \ge \alpha\sqrt{m} | w(X) = W] = O\left(\sqrt{m}\exp\left(\frac{-(\alpha-1)^2}{2}\right)\right).$$

Proof: By Bayes' Theorem, $$Pr[|X| = n | w(X) = W] = \frac{Pr[w(X) = W||X| = n]Pr[|X| = n]}{\sum_{i=0}^{M} Pr[w(X) = W||X| = i]Pr[|X| = i]}.$$

Since we are estimating $|X|$ from $w(X)$, we assume that $|X|$ is uniformly distributed. Letting $$K = \sum_{i=0}^{M} Pr[w(X) = W||X| = i]$$

and simplifying gives $$Pr[|X| = n | w(X) = W] = \frac{Pr[w(X) = W||X| = n]}{K}.$$

Except for the factor of K, the LHS of this equation is just the well-known occupancy distribution derived from tossing n balls into m bins. Let $$\mu(i) = E[w(X)||X| = i] = \left(1 - \left(1 - \frac{1}{m}\right)^{is}\right)m.$$

When $$\mu(i) < \left(1 - \frac{1}{s}\right)m$$

(or, equivalently, when $$i < \frac{m\ln s}{s}), \text{ then } \frac{d\mu}{di} > 1.$$

By Kamath, Motwami, Palem, and Spirakis' Occupancy Bound:

$$Pr[|w(X) - \mu(|X|)| \ge \theta\mu(|X|)] \le 2\exp\left(\frac{\theta^2\mu(|X|)^2(m - 1/2)}{m^2 - \mu(|X|)^2}\right).$$

By combining this bound with the Bayesian equation above and unenlightening algebraic manipulation, one can derive that $$Pr[||X| - I(W)| \ge \alpha\sqrt{m} | w(X) = W] \le \frac{4\sqrt{m}}{K}\sum_{i=\alpha}^{\infty} \exp\left(\frac{-(i-1)^2}{2}\right) =$$

$$O\left(\sqrt{m}\exp\left(\frac{-(\alpha-1)^2}{2}\right)\right)$$

The only tricky part of the derivation is to use that $|i - I(W)| \le |W - \mu(i)|$, which holds because $$\frac{d\mu}{di} > 1.$$

QED

The assumption that |X| is uniformly distributed is a common but controversial assumption in Bayesian analysis. The controversy arises because the validity of the analysis depends on this assumption, but the assumption cannot be verified statistically. For the purposes of bounding the tail probabilities, the uniform distribution is a relatively pessimistic choice; hence we believe it is a safe one.

Figure 2:
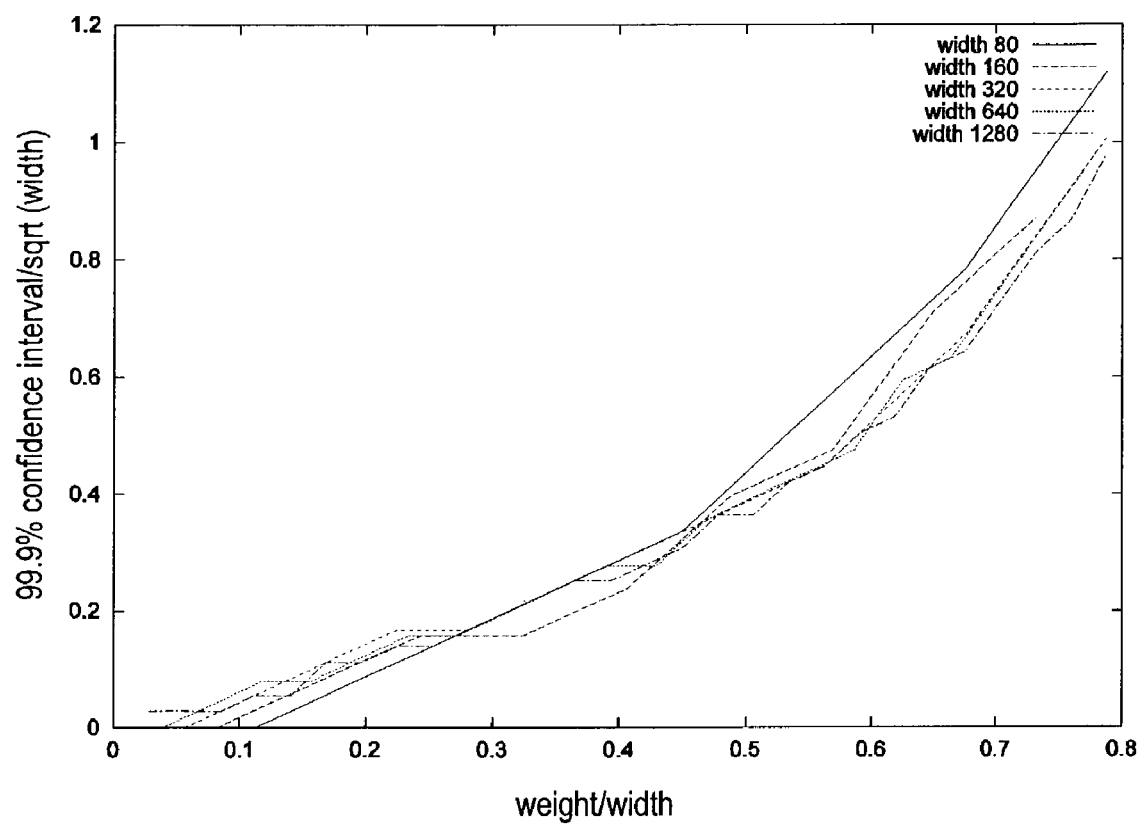
FIG. 2 illustrates the accuracy of estimates of service users obtained by use of a Bloom Filter in accordance with one embodiment.

In practice, $I(\vec{b})$ is a much better estimate of the number of requests than this theorem predicts. The accuracy of using $I(x)$ to estimate the number of insertions performed on a Bloom filter is shown in FIG. 2. Note that the confidence intervals have been normalized to $\sqrt{m}$. Since our protocol requires that content distributors submit Bloom filters $\vec{b}$ with $$w(\vec{b}) \leq \frac{2m}{3},$$

we can conclude that with 99.9% confidence, the actual number of requests received by the service provider differs from $I(\vec{b})$ by at most $$\frac{4\sqrt{m}}{5}.$$

Thus, for example, using a Bloom filter $\vec{b}$ with m=640, if $w(\vec{b})=320$, then with 99.9% confidence, the actual number of insertions performed on the filter is between 80 and 100.

In general, the service provider can attempt to cheat during an auditing period by reporting a Bloom filter $\vec{b}' < \vec{b}$, where $\vec{b}$ is the correct Bloom filter containing all requests for the auditing period. The auditor detects this cheating if there exist i and j such that $\vec{b}'[h_i(N_j)]=0$. The following Proposition describes the service provider's optimal strategy and bounds his chances of success.

Proposition 1: Suppose the service provider is allowed to service L requests, but receives n>L requests. Let $\{J_1, \ldots, J_n\}$ be the set of nonces generated by servicing the requests, and $\vec{b}$ be the Bloom filter generated from $\{J_1, \ldots, J_n\}$. Then the service provider's optimal strategy is to report a Bloom filter $\vec{b}'$ containing the largest subset $S \subseteq \{J_1, \ldots, J_n\}$ such that $I(w(\vec{b}')) \leq L$. If $w(\vec{b})-w(\vec{b}')=D$ and the auditor sent k requests to the service provider, then $$\Pr[\text{service provider succeeds}] \leq \frac{\binom{n-k}{D/s}}{\binom{n}{D/s}}$$

Proof: The service provider gains nothing by reporting a Bloom filter $\vec{b}' \leq \vec{b}$, since it does not decrease his chances of being caught. If there exist i, j such that $\vec{b}'[h_i(J_j) \bmod m]=0$, then setting $\vec{b}'[h_i(J_j) \bmod m]=1$ for $i' \neq i$ does not decrease the service provider's chances of being caught. Hence the service provider's optimal strategy is to report a Bloom filter $\vec{b}'$ containing some subset $S \subseteq \{J_1, \ldots, J_n\}$.

To decrease the weight of the Bloom filter by D, one must remove at least D/s items, since each item can decrease the weight of the filter by at most s. Since the service provider cannot distinguish the auditor's requests, his best strategy is to select the largest S such that $w(\vec{B}[S])$ is below the allowed threshold. We may assume that for any, $J_j \in \{J_1, \ldots, J_n\} \setminus S$ there exists an i such that $h_i(J_j \bmod m)=0$ since otherwise the service provider could add $J_j$ to S without affecting the weight of $\vec{B}[S]$. So cheating successfully requires selecting (at least) D/s items from $\{J_1, \ldots, J_n\}$ without selecting one of the k requests sent by the auditor. The probability of doing this is $$\frac{\binom{n-k}{D/s}}{\binom{n}{D/s}}.$$

QED

Again, the bounds in this proposition are not as tight as possible. In practice, the service provider will have to omit considerably more than D/s requests in order to reduce the weight of the reported Bloom filter below the allowed threshold. To get a better idea what the real chances of cheating successfully are, we wrote a computer program to simulate a content distributor trying to cheat by finding the optimal subset S described in the above proposition. Based on our experiments, the service provider has to remove at least D/2 items from $\{J_1, \ldots, J_n\}$ in order to decrease the weight of his Bloom filter by D.

Figure 3:
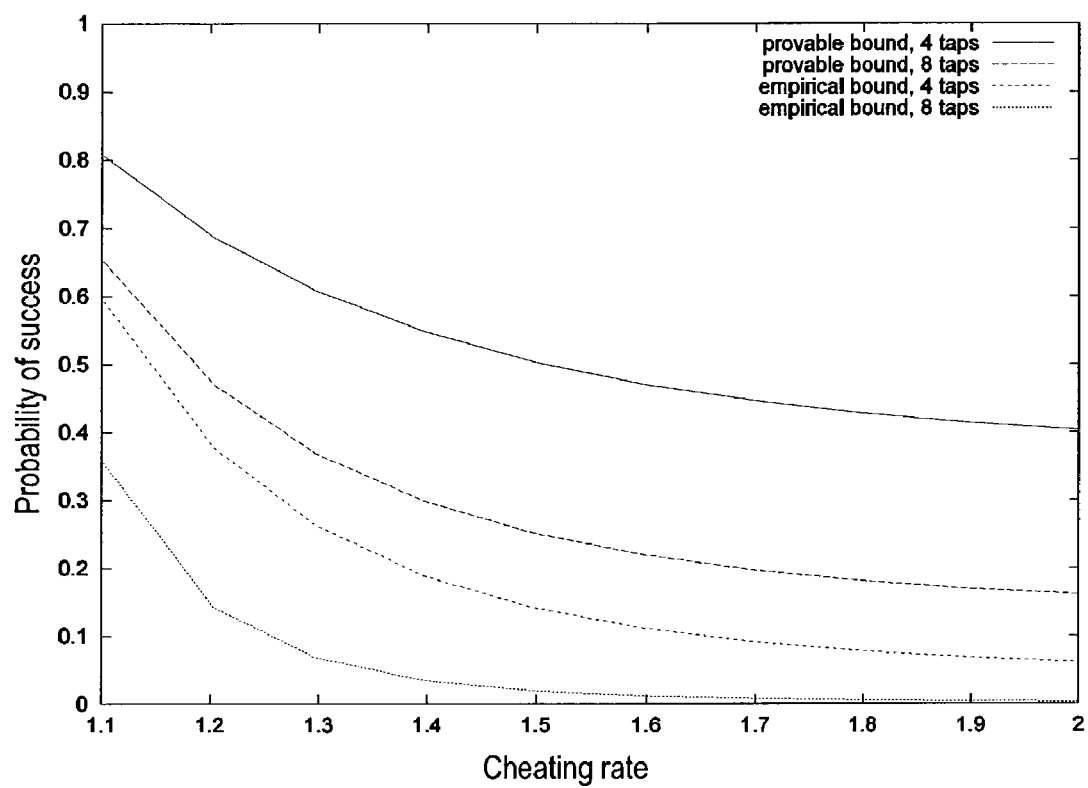
FIG. 3 illustrates the probability that service provider can fool the audit protocol that uses a Bloom Filter in accordance with one embodiment.

FIG. 3 compares the probability of successfully cheating estimated from the above proposition and the probability of success derived from our experiments. Thus, FIG. 3 shows the probability that a content distributor can fool the auditor, assuming m=1024, s=5, and the service provider is allowed to report Bloom filters with weight at most 512 (which corresponds to 128 requests). The top two curves are provable bounds: a content distributor cannot fool the auditor with probability better than these curves indicate. The bottom two curves are empirical bounds: based on computer simulations, we believe that a content distributor cannot fool the auditor with greater probability than these curves indicate. So for example, if a content distributor receives 1.3*128 requests, and the auditor sent 8 auditing requests, then the service provider's chances of successfully convincing the auditor that he only received 128 requests is less than 10%. As the graph shows, the actual probability of cheating is much lower than the proposition indicates.

This protocol also preserves audience anonymity. The service provider and client use a coin flipping protocol to agree on the nonce to be placed in the Bloom filter. Since this nonce is generated randomly, it cannot reveal anything about the identity of the client.

We have described this protocol in terms of request-counting. However, it can also be used to count current audience size (number of current joins) of the service. Suppose the auditor wants to know the current audience size at each minute. Then the service provider simply inserts the IDs for all its active clients into a Bloom filter every minute and sends the filter to the auditor. To audit, the auditor anonymously requests content from the service provider and verifies that it is counted among the active streams. Although the reporting overheads are obviously increased in such a scheme, they are still quite low. For example, an Internet radio station with 20 listeners will have to send the auditor only about 20 bytes of data every minute. The above accuracy and security analyses also apply directly to this scheme.

The protocol can be used with any lossy data representation of negotiated tags that can survive the previous analysis.

Figure 4:
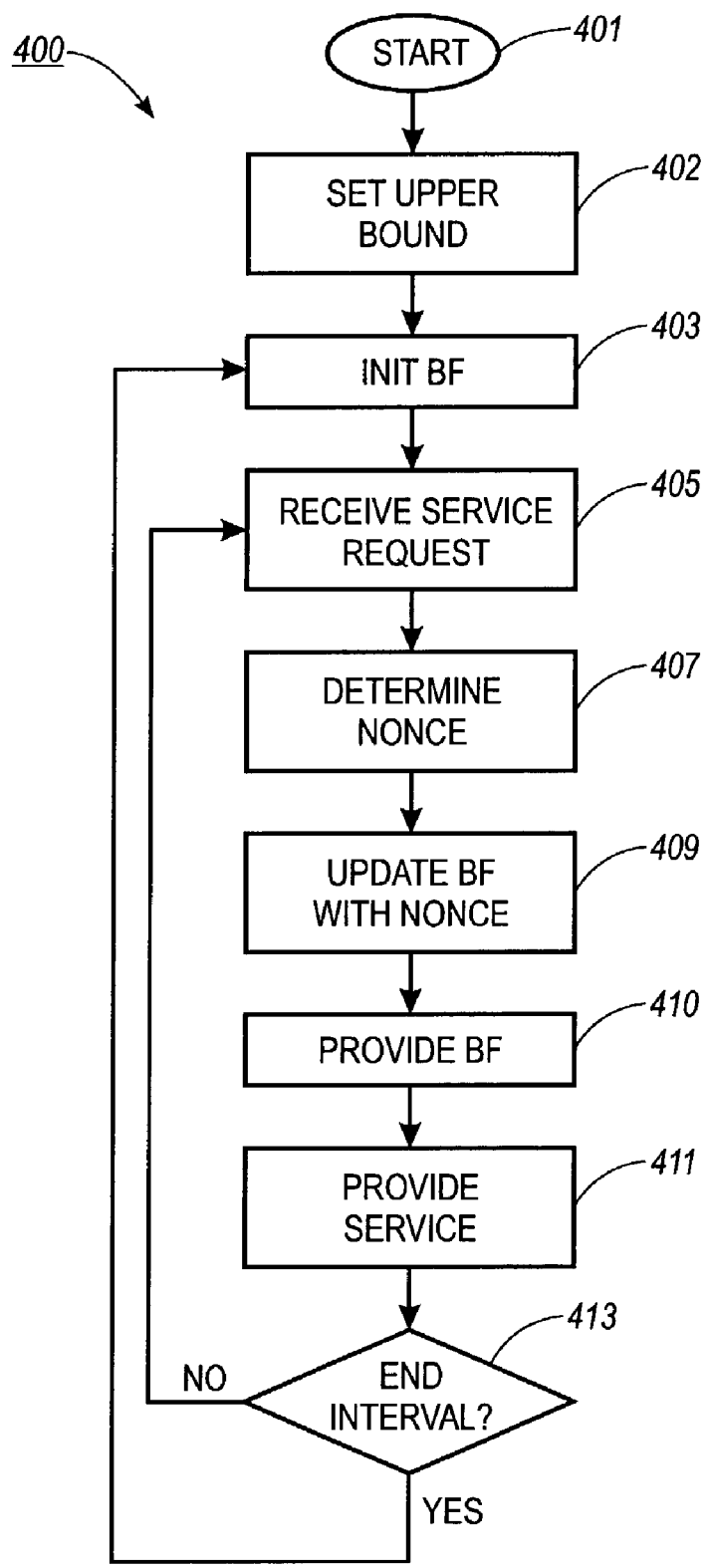
FIG. 4 illustrates a service provider thread in accordance with one embodiment

FIG. 4 illustrates a 'service provider' thread 400 that initiates at a 'start' terminal 401 and continues to a 'set upper bound' procedure 402 that specifies the expected number of clients that will be requesting the service. Then the 'service provider' thread 400 continues to an 'initialize filter' procedure 403 that initializes a lossy data representation of negotiated tags suitable for an expected maximum number of joins. In the case where the lossy data representation is a Bloom Filter (as is the case for the following discussion), all the bits in the bloom filter are set to the initialized state. A 'receive service request' procedure 405 receives a request from a serviced client. One of the serviced clients is an audit client. Next the service provider negotiates with the serviced client for a tag (in the Bloom filter case, a nonce) at the 'determine nonce' procedure 407. The tag is negotiated using (for example) a "coin flip protocol" between the service provider and the serviced client. Once the tag is determined, it is accumulated into the filter by an 'update filter' procedure 409. Thus, as each request is processed, the lossy data representation of negotiated tags accumulates information about the tags negotiated between the service provider and whatever client made the request (for example, by applying the negotiated nonce to the Bloom filter). The service provider then sends the updated lossy data representation of negotiated tags to the requesting client at a 'provide BF' procedure 410 (thus, all the serviced clients including the audit client will receive the current lossy data representation of negotiated tags). Next, the 'service provider' thread 400 services the request using a 'provide service' procedure 411. The 'provide service' procedure 411 uses other protocols to provide the service. These protocols include those used to transfer information or to provide services and in particular include remote procedure call protocols, information transfer protocols, and other protocols that allow the service provider to perform its service function.

Because the audit client is indistinguishable from a serviced client, the lossy data representation of negotiated tags is sent to the requesting client on each transaction. Some embodiments may allow the computer that analyzes the filter to be known to the service provider.

The 'service provider' thread 400 continues to an 'end interval' decision procedure 413. The 'end interval' decision procedure 413 determines whether a specified interval has passed, whether the number of uses of the service approaches the maximum set by the 'set upper bound' procedure 402 or any other circumstance that indicates that the filter should be re-initialized. If the filter need not be re-initialized, the thread continues to the 'receive service request' procedure 405 to await another service request.

However, if the 'end interval' decision procedure 413 determines that the filter needs to be reinitialized, the thread returns to the 'initialize filter' procedure 403 to reinitialize the filter. In some embodiments each client is also informed when the filter is reinitialized so that the audit client can be conditioned to expect missing tags in the next filter it receives. In other embodiments the audit client can monitor the filter to determine when it has been reset by noticing the change in filter composition when the filter has been reset. In yet another embodiment, the service provider can publish a schedule of when the filter will be reset to all the serviced clients (including the audit client). In embodiments where the auditor is known, the service provider can periodically send the filter to the auditor.

One skilled in the art will understand that the 'provide service' procedure 411 can be implemented as a separate thread or task such that the providing of the service need not complete before the 'service provider' thread 400 advances to the next procedure. Such a one will also understand that the 'service provider' thread 400 can be terminated and restarted on a periodic basis known to the audit client and so to re-initialize the filter.

One skilled in the art will understand that there are many equivalent designs for responding to the one or more requests that are received by the service provider thread.

Figure 5:
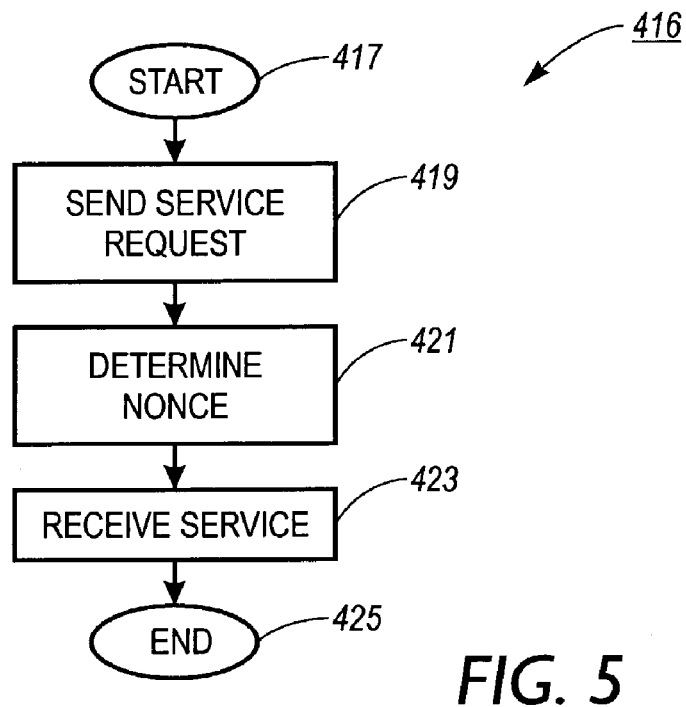
FIG. 5 illustrates a client service request thread in accordance with one embodiment.

FIG. 5 illustrates a 'client service request' thread 416 that runs in a serviced client and that initiates at a 'start' terminal 417. The thread continues to a 'send service request' procedure 419 that sends a service request to the service provider where the service request is processed by the 'receive service request' procedure 405. The thread eventually reaches the 'determine nonce' procedure 421 that negotiates with the 'determine nonce' procedure 407 to determine a nonce (or tag) for the transaction. The 'determine nonce' procedure 407 and the 'determine nonce' procedure 421 can agree on a random tag, or can use any coin-flip protocol to determine the tag to inhibit cheating. In some embodiments, the serviced client also receives a filter that it ignores. Once the tag is determined, the thread continues to a 'receive service' procedure 423 to receive the results of the requested service. Finally the thread completes at an 'end thread' terminal 425.

Figure 6:
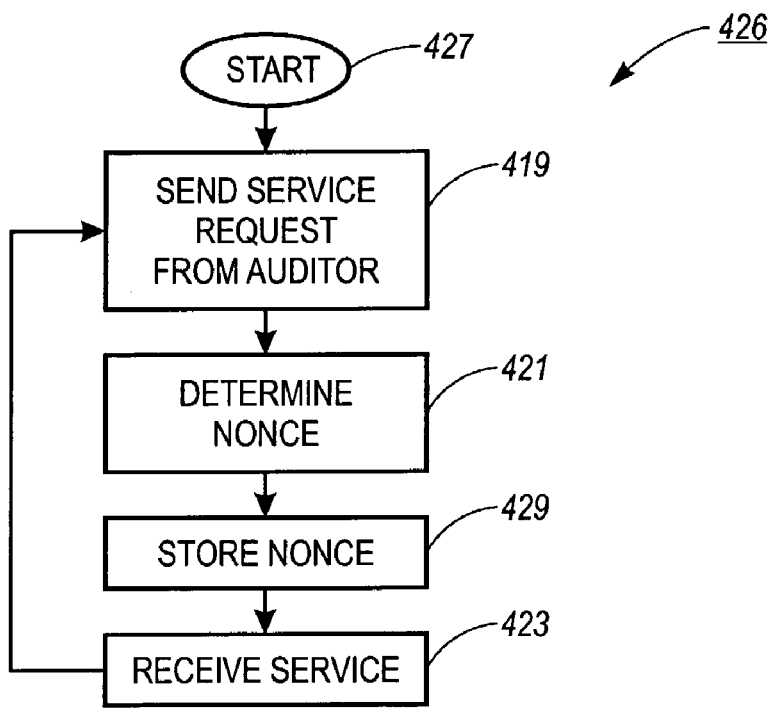
FIG. 6 illustrates an audit client service request thread in accordance with one embodiment.

FIG. 6 illustrates an 'audit client service request' thread 426 that runs in an audit client (remember that the audit client and the serviced client look the same to the service provider). The thread initiates at a 'start' terminal 427 and continues to the 'send service request' procedure 419 and the 'determine nonce' procedure 421 that operate as previously described with respect to FIG. 5. Once the tag (nonce) is determined by the 'determine nonce' procedure 421, the 'save nonce information' procedure 429 stores the received nonce thus, maintaining audit client tag information. In some embodiments, the audit client also receives a filter that it can use as is subsequently described with regard to FIG. 7. Next, the thread continues to the 'receive service' procedure 423 to receive the requested service and so remain indistinguishable from a serviced client. Thus, the audit client seeds requests for service within the set of requests being serviced by the service provider while maintaining evidence of which tags were negotiated for the seeded requests. To make cheating more difficult, the seeded requests can be anonymously sent to the service provider.

The 'save nonce information' procedure 429 can store the tags as a list, or can maintain its own Bloom filter that accumulates nonce information in a similar manner to that of the service provider.

Figure 7:
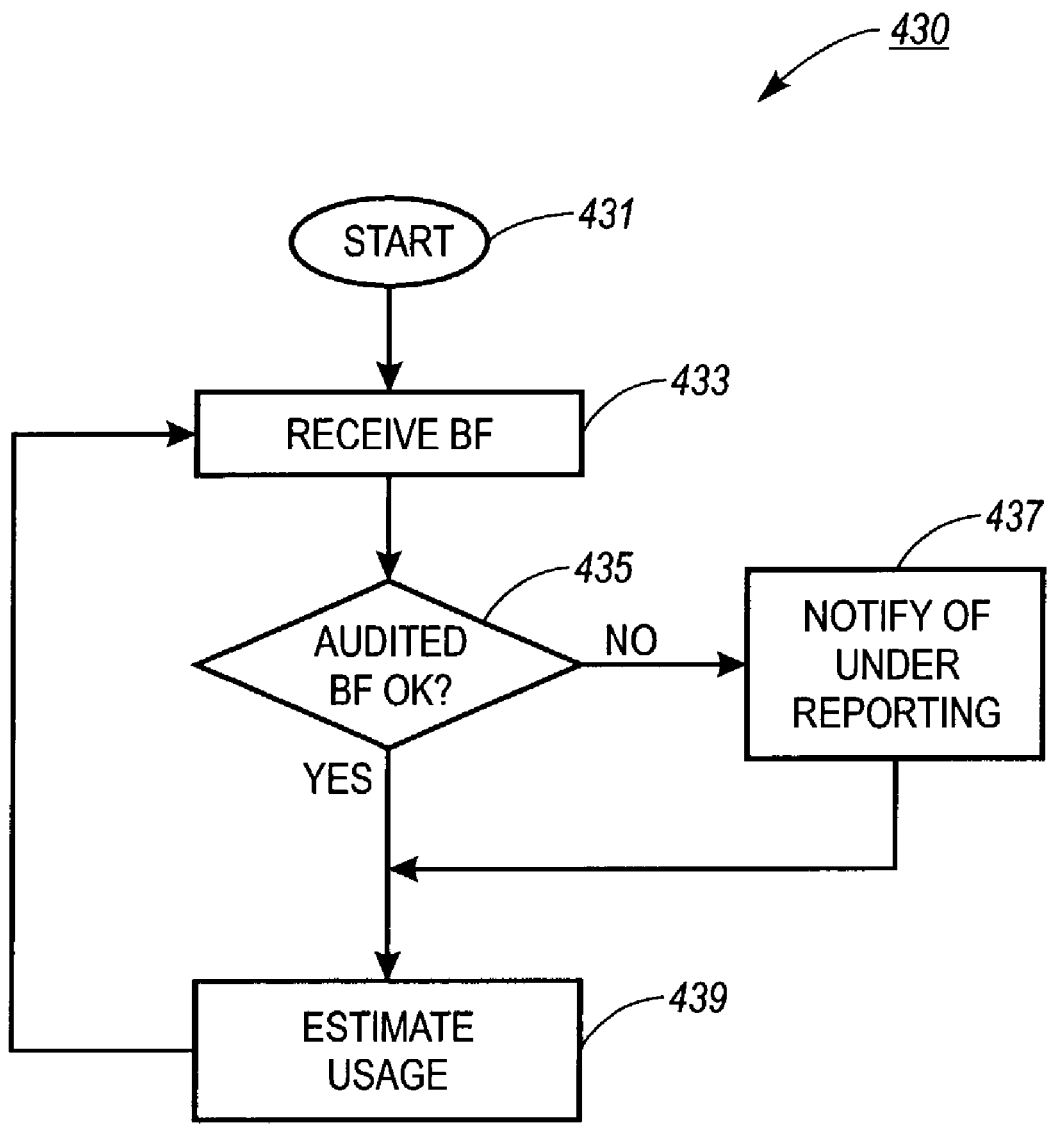
FIG. 7 illustrates an audit evaluation thread in accordance with one embodiment.

FIG. 7 illustrates an 'audit evaluation' thread 430 that initiates at a 'start' terminal 431 and continues to a 'receive filter' procedure 433. The 'receive filter' procedure 433 waits for, and then receives the information sent by the 'provide BF' procedure 410 as described with regards to FIG. 4 (if the audit evaluation thread executes in a computer other than the computer that seeds the service requests, the thread will also need to wait for tags sent by the seeding computer (this step is not shown)). Once the 'audit evaluation' thread 430 has access to both the filter and the tags, it continues to an 'audit filter' decision procedure 435 that applies the tags to the received filter to verify that all the seeded requests were recognized (counted) by the service provider (while taking into account any of the filter re-initialization conditions). If any of the tags are missing from the filter, the 'audit evaluation' thread 430 continues to a 'notify of underreporting' procedure 437 that notifies the service owner of the underreporting occurrence.

Regardless, of whether the filter shows that the seeded requests were all reported, then an 'estimate usage' procedure 439 calculates $I(\vec{b})$ as an estimate for the number of times the service provider provided the service and provides the estimate to the service owner. After reporting, the 'audit evaluation' thread 430 continues to a 'receive filter' procedure 433 to await the next filter.

One skilled in the art will understand that in some embodiments of the invention the auditor need not actually receive or use the requested service because the primary purpose of auditor is to seed requests in the stream of requests being serviced by the service provider. However, by consuming the provided service the audit client appears more like the other serviced clients and is thus, less likely to be identified as an auditor.

One skilled in the art will understand that in some embodiments the computer that performs the seeding operation need not receive the filter from the service provider. This can be accomplished, for example, by the service provider periodically sending the filter information, and the seeding computer sending the tag information to a separate computer to perform the analysis described with respect to FIG. 7.

In addition, such a one will understand that the 'audit evaluation' thread 430 can be performed on each filter received by the audit client and thus is able to detect when the filter has been reset.

Although the bandwidth required by the previously described embodiment is a linear function with the number of requests, the bandwidth required to transmit the filter and to negotiate the tag remains insignificant when compared to the bandwidth required to provide many of the requested services (for example, streaming audio/video, or data base access).

The previous discussion was related to monitoring the use of any service provider (including those whose service is that of providing content). The next section teaches a protocol that provides security against both inflation and deflation of audience size where information is transferred from the service provider to the serviced client.

A Second Protocol for Inferring a Number of Participants

In the second protocol, the auditor is able to infer the audience size (the number of systems that have "joined" to access the service) from a constant number of bits that are associated with the (encrypted) content resulting from the service provided to a serviced client by the service provider. The protocol offers security against both inflation and deflation of the number of participants (the joins). The protocol is very applicable to unicast settings such as downloading of content from Internet retailers. In addition, in a multicast-enabled network, the protocol can be used with streaming applications such as Internet radio. With the second protocol the service provider is unlikely to be able to either inflate or deflate the number of joins or times the service provider provided the service.

Using this protocol, each serviced client stores a set of encryption keys issued by a key server that is a trusted party. In one embodiment, during the initial phase of the protocol, the key server sends all the keys to the service provider. When a serviced client requests the content, the key server gives some subset of the keys to the serviced client and sends the ID number of each of the client's keys to the service provider. To distribute content to the current set of serviced clients, the service provider forms the intersection of the serviced clients' key sets, T, and chooses a key from T for encrypting the content resulting from the service. Because the key server assigns keys to the serviced clients probabilistically, the auditor (who may be the same as the key server) when requesting the content anonymously, can infer the audience/join size from the encryption key used to encrypt the content resulting from the service.

In another embodiment, the key server sends a collection of keys to the serviced clients and the serviced clients then transform and send the collection of keys to the service provider. To transform the keys in the collection of keys that will be sent to the service provider the serviced client computes a one-way function of the keys in the collection of keys received from the key server and the service provider's identification. For example, if $f$ is a one-way function, the serviced client could send the following set of keys to the service provider $\{f(k, \text{the service provider's ID}) | k \text{ is a key received from the key server}\}$. This allows the keys generated by a single key server to be used for accessing content from multiple service providers. A one-way function is used so that the service providers would be unable to collude to determine which keys are "cheaper" to use (determining which keys indicate a smaller audience).

By having the audit client anonymously receive the content resulting from the service, it is able to determine that the service provider is abusing the protocol (for example, by distributing keys to clients—to maintain the appearance of a small audience). For applications in which the surreptitious distribution of keys to clients by the service provider is a concern, a simplified version of the analysis performed for the first protocol can be performed to calculate the frequency with which the audit client should request content.

The key server assigns keys to clients as follows. First, the entire set of keys is partitioned into t sets, $S_1, \ldots, S_t$. Each client receives any particular key with a fixed, independent probability. For keys in the same set $S_i$, this probability is the same. By choosing the sets $\{S_i\}_{i=1}^{t}$ to be of decreasing size (as i increases), but with increasing associated probabilities, the key server can control the proportion of keys in T that are in any $S_i$ given the audience size. More precisely, if the audience is small, T is dominated by keys from $S_i$, but as the audience grows, the proportion of keys in T that are in $S_i$ will be far less than the proportion that are in $S_i$ for i>1. Hence, because the service provider doesn't have any a priori knowledge of the composition of the sets, $\{S_i\}_i$, the distributor is unable to distinguish between the keys in T and so the choice of k∈T is a reflection of the distribution of T, and by inference, the audience/join size.

To illustrate the core ideas of the protocol consider the metaphor of a leaky bucket containing pebbles of slightly different (but indistinguishable to the naked eye) sizes. The initial contents of the bucket are chosen by the key server. When a client requests the content, the bucket is shaken and pebbles are likely to fall out, with the smaller pebbles being the most likely to fall. Periodically, a pebble must be selected from the bucket and presented to the auditor (analogously in our protocol, a key must be chosen). Hence if a bucket contains mostly large pebbles then it's likely the bucket has been shaken a lot due to a large number of clients. Since it is impossible for the service provider to distinguish between the remaining pebbles, the service provider is unlikely to succeed in misleading the auditor by consistently choosing a small pebble, and analogously in our protocol, by choosing keys that are only known to small sets of clients.

Figure 8:
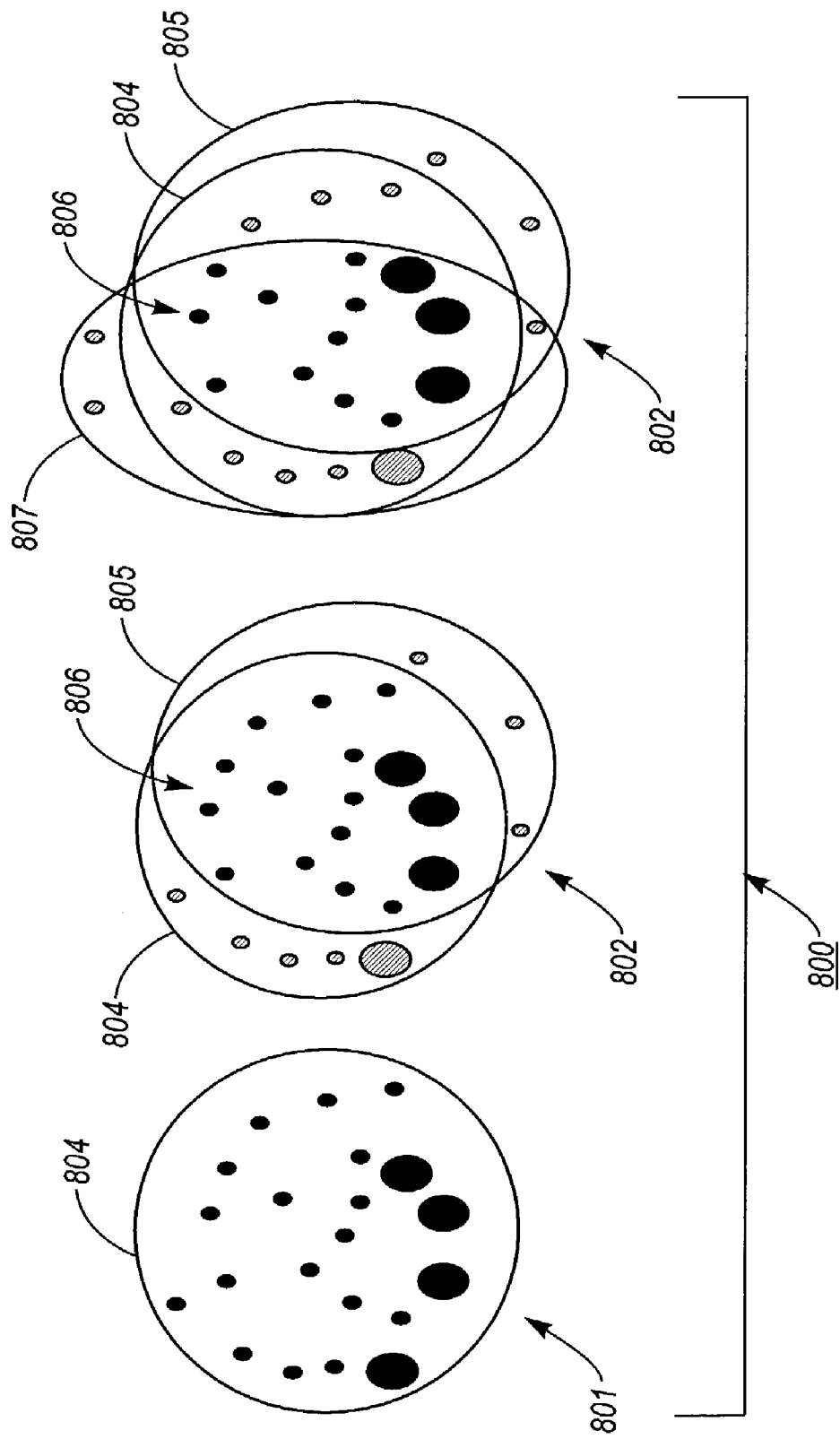
FIG. 8 illustrates how a set of available keys change over time in accordance with one embodiment.

FIG. 8 demonstrates how T may change over time. The ovals represent keys in the set T when there are 1, 2 and 3 clients. The larger ovals correspond to keys that are more likely to be assigned to any given client. The proportion of large ovals in T increases as the number of clients increases. Hence, the key that is selected from T reflects the audience size. To be more specific, FIG. 8 illustrates a change in available keys as the number of serviced clients increase 800 showing a single client situation 801, a dual client situation 802, and a three-client situation 803. The first client receives a first key set 804 containing keys that the service provider can select to encrypt the content provided by the service. When a second serviced client joins (as shown in the dual client situation 802) the second key set 805 is provided that is different from the first key set 804. A key can be selected from the key set intersection 806. If a third serviced client joins, it receives a third key set 807 (as shown in the three-client situation 803) and the key set intersection 806 from which the service provider can select keys is again reduced.

This protocol takes as input a positive integer m representing the number of keys in the system, a positive integer t, and positive integers $S_1, \ldots S_t$ such that $S_1+S_2+\ldots+S_t=m$. The keys are partitioned into t sets, $S_1, \ldots, S_t$, such that for each i, $|S_i|=S_i$, where $S_1>S_2>\ldots>S_t$. For each $i=1, \ldots, t$ there is a probability $p_i$ that the key server will assign a key $k_j \in S_i$ to any given client (keys are assigned independently), where $p_1<p_2<\ldots<p_t$. Numbers $\epsilon_1, \epsilon_2, 0<\epsilon_1, \epsilon_2<1$, are also input to provide a gauge of the accuracy of the audience measurements. These parameters imply an upper bound, $n_{max}$, on the number of joins that can be accurately measured by the system. The variable n is used to denote the actual number of joins. The protocol consists of the following steps:

Step 1: The key server randomly generates m keys, $k_1, \ldots, k_m$, and in one embodiment sends them to the service provider (in another embodiment the some of the keys will be first sent to the serviced clients who will, in turn, send the keys to the service provider).

Step 2: Upon contacting the service provider, a serviced client, $u_i$, receives a set of keys $K_i \subseteq \{k_1, \ldots, k_m\}$ from the key server. For $j=1, \ldots, m$, $k_j \in K_i$ with probability $p_r$ if $k_j \in S_r$. The key server sends the service provider the ID numbers of the client's keys.

Step 3: To distribute content to clients $u_{j_1}, \ldots, u_{j_r}$, the service provider chooses a key $k \in T = K_{j_1} \cap \ldots \cap K_{j_r}$ and encrypts the content (or perhaps, a key that is used to encrypt the content) with k. A fresh key should be chosen regularly (e.g. with every few songs played by an Internet radio station).

Step 4: Periodically, the auditor requests content and notes the key, k, that the service provider is using in Step 3. There exists $i \in \{1, \ldots, t\}$ such that $k \in S_i$. The auditor calculates the distribution of the random variable that measures the proportion of keys in T that are in $S_i$ as a function of n, $$\left(\frac{|T \cap S_i|}{|T|} \middle| n\right),$$

to within a confidence level of $1-\epsilon_1$. Using this distribution, the auditor determines a range $[n_1, n_2]$ such that for each $n \in [n_1, n_2]$, $P(k \in S_i|n) \geq \epsilon_2$, and estimates the audience size.

a) To increase the likelihood of inferring audience size correctly, the auditor can monitor the content through several key changes.

b) If the auditor has contacted the service provider previously and received a different set of keys, the auditor should check that k is also in that key set. Alternatively, the auditor can request the content as several different clients and perform the same checks. If any of these checks fail, the service provider is not following the protocol.

The client cannot cause the audience size to appear larger than it is by sending only a subset of their keys to the service provider if the key server sends the keys rather than the client. On the other hand by having the clients send their key sets to the content provider, it is easier for the key service to support more content providers because it is harder for the service providers to collude to determine the cheaper keys.

Note that the probability that directly infers the number of participants (the audience size) is $P(n=x|k \in S_i)$. Since the distribution on n is unknown we cannot calculate this probability precisely. However, provided some information on the distribution of n is available, this probability can be derived from the $P(k \in S_i|n=x)$ by using:

$$P(n=x|k \in S_i) = \frac{P(k \in S_i|n=x)P(n=x)}{P(k \in S_i)} \geq P(k \in S_i|n=x)P(n=x).$$

For example, if $P(n=x) \geq \alpha$ for all x, then we have an upper bound: $P(n=x|k \in S_i) \geq \alpha P(k \in S_i|n=x)$, and if n is uniformly distributed, we have an equality: $P(n=x|k \in S_i) = c_i P(k \in S_i|n=x)$ where $$c_i = \sum_{y=1}^{n_{max}} P(k \in S_i|n=y).$$

Hence, we believe $\{P(k \in S_i|n=x)\}_x$ is sufficient to infer the value of n as being in $[n_1, n_2]$.

This protocol relies on the service provider's inability to distinguish between the keys in the intersection, T. The service provider can gain such an ability in the following ways. First, a key that is not known to any of a large set of clients is less likely to be in $S_t$ than a key in T. However, provided the service provider follows the protocol and encrypts the content so that all of the audience can decrypt it, the service provider is unable to make use of this information. The other information from which the service provider learns about the keys comes from bills (e.g. licensing royalties). For example, if the distributor is charged less when using key k than when using key k', the distributor knows the index $j_k$ such that $k \in S_{j_k}$ is less than the index $j_{k'}$ such that $k' \in S_{j'_k}$. This can be remedied by refreshing the system with every bill.

There is also the possibility that the service provider attempts to cheat in a similar way as in our first protocol, namely by removing some users' key sets from the calculation of the intersection, T, in order to get a larger set from which to draw the encryption key. We argue that it is unlikely this attack will be successful. First, cheating in this way can have the effect of preventing some users from accessing the content (which should generate complaints). Second, it is difficult to guarantee that a small audience will be inferred by the auditor because the key allocation algorithm is probabilistic. That is, if the service provider chooses a key that is not known to several of the clients then there is still some probability that this key is in $S_i$ for large i, in which case a large audience will be inferred. To guarantee that a small audience will be inferred, the service provider must use a key that is not known to several clients, in which case the service provider may indeed only be able to reach a small audience.

Finally, the service provider can potentially benefit from collusion with clients or other service providers. If the key server is using the same global set to allocate keys to clients of different service providers (which is a desirable practice because it can allow clients to "surf" multiple service providers without needing to repeat the initialization phase) then the service providers (and users) may be able to distinguish between keys that they wouldn't have been able to otherwise. However, as mentioned earlier, this may be only of limited value because a key that causes a small audience to be inferred does so because it is only likely to be stored by a small number of clients.

Analysis

In this section we develop equations that allow the auditor to execute the protocol. First, we find an accurate approximation to the distribution of $$\left(\frac{|T \cap S_i|}{|T|} \bigg| n\right).$$

Lemma 1: Let $0<\delta<1$. For $i=1, \ldots, t$ and $n=x$, $P(k \in S_i | n=x)$ is at least as large as $$\frac{(1-\delta)s_i p_i^x}{(1+\delta)(s_1 p_1^x + \ldots + s_{i-1} p_{i-1}^x + s_{i+1} p_{i+1}^x + \ldots + s_t p_t^x) + (1-\delta)s_i p_i^x}$$

and at most as large as $$\frac{(1+\delta)s_i p_i^x}{(1-\delta)(s_1 p_1^x + \ldots + s_{i-1} p_{i-1}^x + s_{i+1} p_{i+1}^x + \ldots + s_t p_t^x) + (1+\delta)s_i p_i^x}$$

with probability at least $1-\epsilon_1$, when $$\left(\frac{e^\delta}{(1+\delta)^{1+\delta}}\right) s_t p_1^{n_{\max}} \leq \frac{1-(1-\epsilon_1)^{1/t}}{2}$$

and $$e^{-\delta^2} s_t p_1^{n_{\max}/2} \leq \frac{1-(1-\epsilon_1)^{1/t}}{2}.$$

Proof: For $i=1, \ldots, t$, when the number of clients is x, the random variable $|T \cap S_i|$ is binomially distributed with size $S_i$ and probability $p_i^x$. Hence, the expected value of $|T \cap S_i|$ is $s_i p_i^x$. Applying Chernoff bounds (see, for example, R. Motwani and P. Raghavan, *Randomized algorithms*, Cambridge University Press, 200), it follows that, $|T \cap S_i| \in [(1-\delta)s_i p_i^x, (1+\delta)s_i p_i^x]$ with probability at least $(1-\epsilon_1)^{1/t}$ when both $$\left(\frac{e^\delta}{(1+\delta)^{1+\delta}}\right) s_i p_i^{n_{\max}} \leq \left(\frac{e^\delta}{(1+\delta)^{1+\delta}}\right) s_t p_1^{n_{\max}} \leq \frac{1-(1-\epsilon_1)^{1/t}}{2} \text{ and}$$

$$e^{-\delta^2} s_i p_i^{n_{\max}} \leq e^{-\delta^2} s_t p_1^{n_{\max}/2} \leq \frac{1-(1-\epsilon_1)^{1/t}}{2}.$$

Hence, $$P(k \in S_i | n=x) = \frac{|T \cap S_i|}{|T|} = \frac{|T \cap S_i|}{|T \cap S_1| + \ldots + |T \cap S_t|}$$

is in the interval stated in the lemma with probability at least $$\left(1 - 2\frac{1-(1-\epsilon_1)^{1/t}}{2}\right)^t = 1 - \epsilon_1,$$

QED.

From the above lemma, it follows that the auditor needs to find x values such that $$\frac{(1-\delta)s_i p_i^x}{(1+\delta)(s_1 p_1^x + \ldots + s_{i-1} p_{i-1}^x + s_{i+1} p_{i+1}^x + \ldots + s_t p_t^x) + (1-\delta)s_i p_i^x} \geq \epsilon_2$$

to complete the protocol. In addition, $n_{max}$, $s_i$ and $p_i$ must be chosen to satisfy Lemma 1, for example, by using the bounds in the following corollary.

To satisfy step 4 of the protocol it suffices (but isn't generally necessary) to choose $$n_{\max} \leq \frac{\ln\left(\frac{c(\epsilon_1, \delta, t)}{s_t}\right)}{\ln p_1} \text{ and } S_i \geq \frac{c_i(\epsilon_1, \delta)}{p_i^{n_{\max}}}$$

for all i, where $c(\epsilon_1,\delta,t)$ and $c_i(\epsilon_1,\delta)$ are defined below. Provided these inequalities are met, the expected number of keys that a client must store is at least $$\sum_{i=1}^{t} \frac{c_i(\epsilon, \delta)}{p_i^{n_{\max}-1}}.$$

Proof: The constant $c_i(\epsilon_1,\delta)$ in the upper bound on $s_i$ comes from solving the following two inequalities used in the proof of Lemma 1:

$$\left(\frac{e^\delta}{(1+\delta)^{1+\delta}}\right) s_i p_i^{n_{\max}} \leq \frac{1-(1-\epsilon_1)^{1/t}}{2} \text{ and } e^{-\delta^2} s_i p_i^{n_{\max}/2} \leq \frac{1-(1-\epsilon_1)^{1/t}}{2}.$$

It follows that $$c_i(\varepsilon_1, \delta) = \max\left\{\frac{2\ln\left(\frac{1-(1-\varepsilon_1)^{1/t}}{2}\right)}{-\delta^2}, \frac{\ln\left(\frac{1-(1-\varepsilon_1)^{1/t}}{2}\right)}{\ln\left(\frac{e^\delta}{(1+\delta)^{1+\delta}}\right)}\right\}.$$

The bound on $n_{max}$ follows similarly with $$c(\varepsilon_1, \delta, t) = \min\left\{\frac{2\ln\left(\frac{1-(1-\varepsilon_1)^{1/t}}{2}\right)}{-\delta^2}, \frac{\ln\left(\frac{1-(1-\varepsilon_1)^{1/t}}{2}\right)}{\ln\left(\frac{e^\delta}{(1+\delta)^{1+\delta}}\right)}\right\}.$$

The lower bound on the expected number of keys per client follows by substituting the lower bound for $s_i$ into the quantity, $$\sum_{i=1}^{t} p_i s_i.$$

QED

The following example shows how the protocol can be used to determine that a threshold number of clients has been achieved. To demonstrate the example we pick $p_2=1$ and $t=2$. In general, it is unwise to choose $p_2=1$ and $t=2$ because the service provider then knows that any key, k, that's not stored by all the clients, is in $S_1$ with probability 1. However, even in this example it is unclear that that using key k would yield a successful attack, since we expect k to only be stored by around 7 clients ($0.6 n_{max}$) which is already very close to the 6 client audience that the auditor will infer from the usage of k.

Let $s_1=37000$, $p_1=0.6$, $s_2=370$, $p_2=1$ and $n_{max}=13$. Because $|T \cap S_2|=370$ with probability 1, we need only find a confidence interval for $|T \cap S_1|$ and this will imply confidence intervals for $|T \cap S_1|/|T|$ and $|T \cap S_2|/|T|$. Setting $\delta=0.2$, by the proof of Lemma 1 we need the following inequality to hold:

$$(.98)^{s_1 p_1^{13}} < \frac{\varepsilon_1}{2}.$$

Figure 9:
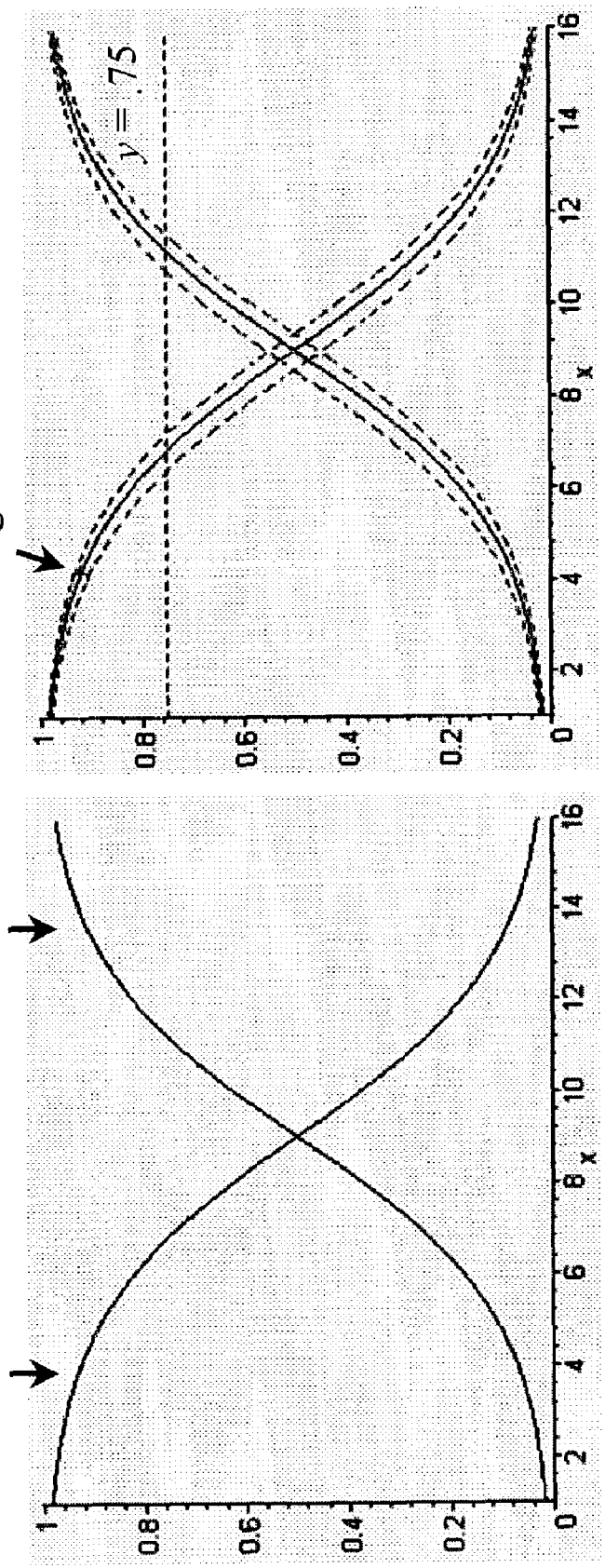
FIG. 9 demonstrates how one embodiment can be used to determine that a threshold number of service requests has been reached.

Solving for $\varepsilon_1$ yields $\varepsilon_1 \geq 0.75$. If we choose $\varepsilon_2=0.75$, then with at least 0.75 confidence, it follows by solving the inequality, $$\frac{(1-\delta)37000(.6)^x}{(1-\delta)37000(.6)^x + 370} \geq .75$$

for x, that $P(k \in S_1 | n \leq 6) \geq 0.75$. Similarly, by solving, $$\frac{370}{(1+\delta)37000(.6)^x + 370} \geq .75$$

we get, $P(k \in S_2 | n \geq 12) \geq 0.75$. Hence, if $k \in S_1$ the auditor returns the interval [1,6] for n and if $k \in S_2$ the interval $n \geq 12$ is returned. This is depicted in FIG. 9 wherein in the left-hand side of the figure we graph, $$\frac{p_i^x s_i}{p_1^x s_1 + p_2^x s_2}$$

for i=1,2 (where $p_1=0.6$, $p_2=1$, $s_1=37000$, $s_2=370$) as estimates for $P(k \in S_1 | n=x)$ and $P(k \in S_2 | n=x)$. $P(k \in S_1 | n=x)$ and $P(k \in S_2 | n=x)$ are within the distance indicated by the dashed lines of their respective estimates with probability at least 0.75. Note that the confidence intervals hold up to n=13 only.

In this example, we expect a client to store 22,570 keys. This represents 0.17 megabytes of keying material if the keys are each 64 bits long. While this is significant, it is a fraction of the space required by most media players. Viewed differently, after listening to streaming music at a data rate of 28.8 kilobits per second for less than 20 minutes, the keying material is less than 0.0425 of the audio data.

One of the aspects of the invention is that of using the previously described technology to determine the number of clients that are using the services provided by the service provider. One aspect of the invention first partitions a number of keys into key sets. Each client serviced by the service provider is given the keys in an associated key set. The service provider selects a key identifier that is selected from an intersection of all the key sets associated with the serviced clients. If an audit client poses as a client (such as by seeding a request for the service), then the audit client can accurately infer the number of clients receiving the service from the service provider from the key identifier provided to access the results of the service (for example, where the service is that of providing content, by the key identifier used to select the key to decrypt the content).

Figure 10:
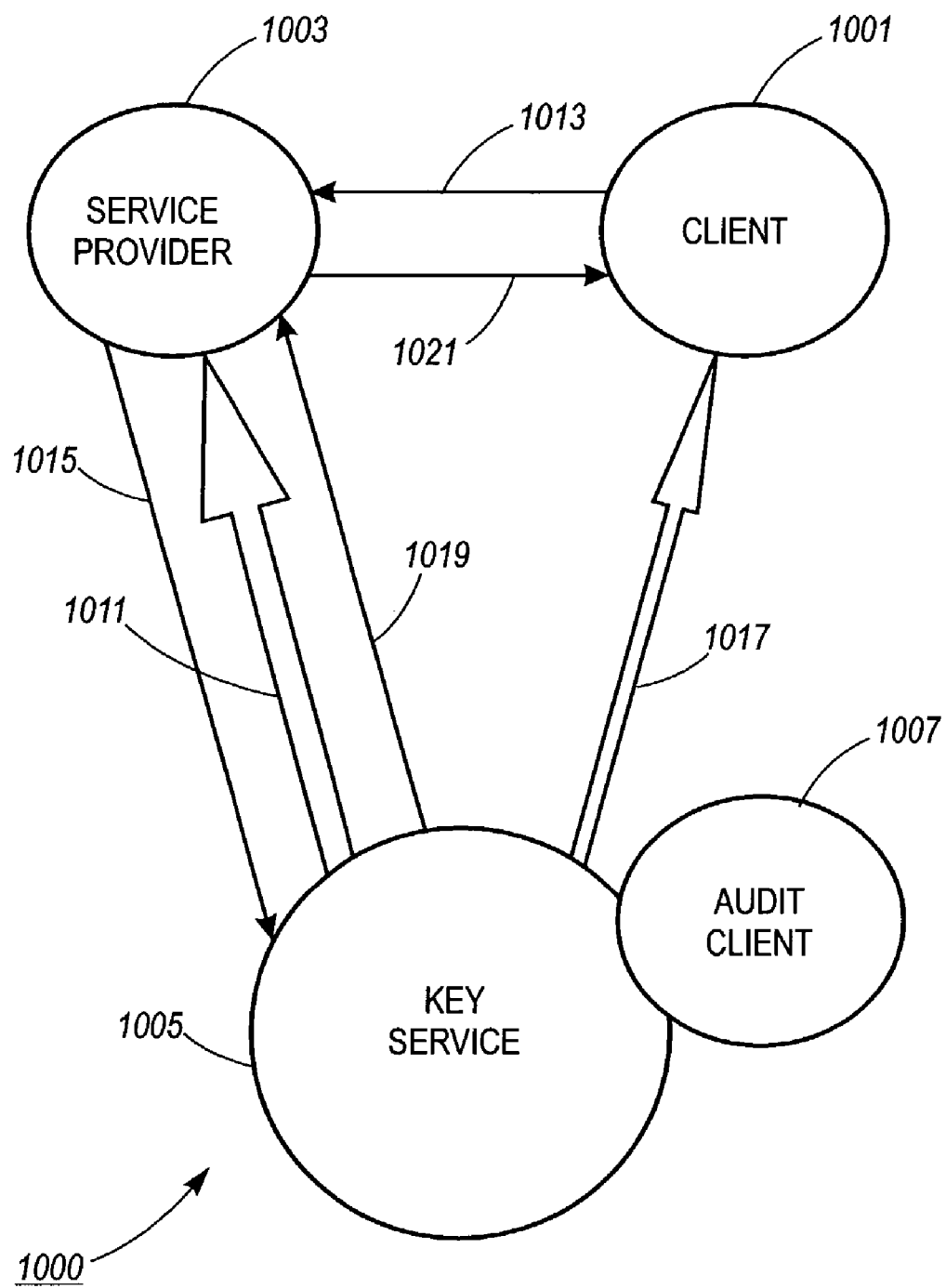
FIG. 10 illustrates a first system architecture of an embodiment.

FIG. 10 illustrates a first system architecture diagram 1000 showing a serviced client 1001, a service provider 1003, a key server 1005, and an audit client 1007. The key server 1005 generates a collection of keys and partitions them into sets (as per the previous discussion) and sends the keys to the service provider 1003 as a complete key collection transfer 1011. To access the service provided by the service provider 1003, the serviced client 1001 sends a service request 1013 to the service provider 1003 for a service provided by the service provider 1003. The service provider 1003 receives the request and sends a forwarded service request 1015 to the key server 1005. The key server 1005 then performs a client key collection transfer 1017 that transfers a collection of keys from a selected key set to the serviced client 1001. In addition, the key server 1005 performs a client key identifier transfer 1019 that sends a message to the service provider 1003 that identifies the keys that were sent to the serviced client 1001. The service provider 1003 then forms the intersection of all the key collections that have been distributed to the serviced clients requesting the service and selects a key from within the intersection (in other words, the selected key is available to all the serviced clients). The service provider 1003 next performs a selected key identifier transfer 1021 that sends the selected key identifier to the serviced client 1001. The serviced client 1001 selects the identified key to gain access to the requested service. For example, if the requested service is a content transfer, the content can be encrypted using the key, the key identification can be accessibly merged (or separately sent) with the content, and when the serviced client receives the content, it can extract the key identifier and access the identified key to decrypt the content.

The audit client 1007 (that can be included as part of the key server 1005 or can be a separate system that has access to the partitioned key set information) can request service in the same manner as the serviced client 1001 but, on receiving the key identification via its own the selected key identifier transfer 1021, can infer the number of serviced clients accessing the service using the previously discussed techniques. The interaction of the audit client 1007 with the other components in the system appears to the other components to be that of a typical serviced client. Thus, these interactions are not explicitly shown in the figure. However, the audit client 1007 and the key server 1005 have an additional relationship in that the audit client 1007 has knowledge of the key sets defined by the key server 1005.

One implementation of the first system architecture diagram 1000 is subsequently described with respect to FIG. 11, FIG. 12, FIG. 13, and FIG. 14.

Figure 11:
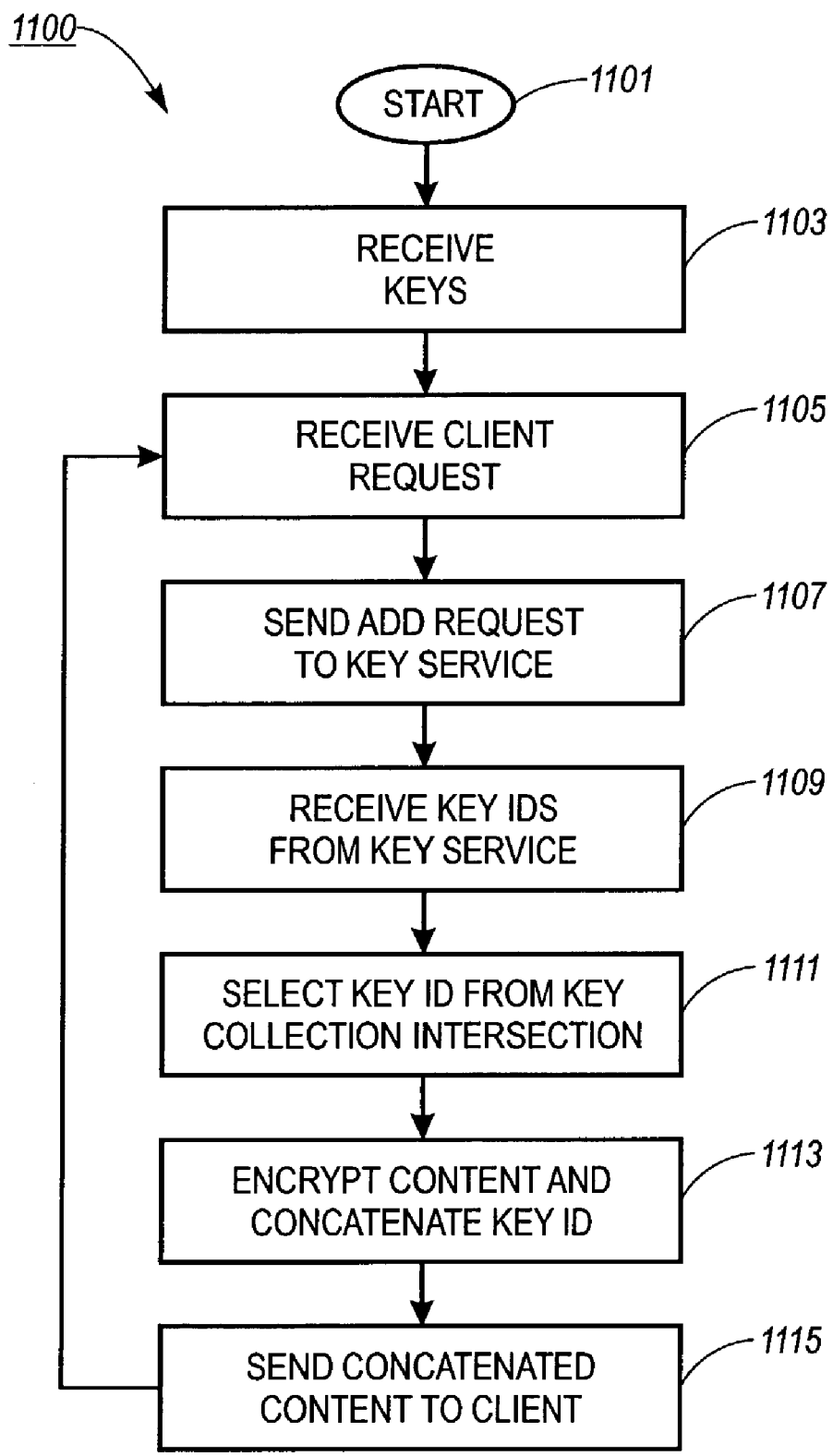
FIG. 11 illustrates a service provider thread in accordance with the architecture of FIG. 10.

FIG. 11 illustrates a service provider thread 1100 that runs in the service provider 1003 and provides a service to a number of serviced clients such as the serviced client 1001 and the audit client 1007. The service provider thread 1100 initiates at a 'start' terminal 1101 and continues to a 'receive keys' procedure 1103. The 'receive keys' procedure 1103 receives the collection of keys from the key server 1005 (the operation of which is described with respect to FIG. 12).

Once the service provider 1003 has received the key collection, the service provider thread 1100 is able to service requests from serviced clients. A 'receive client service request' procedure 1105 receives a request from a serviced client for a service, checks to determine that the request is well formed and saves information about the request for subsequent processing.

Next, the service provider 1003 forwards the request to the key server 1005 using a 'send add request to key server' procedure 1107 and continues to a 'receive key IDs from key server' procedure 1109. The 'receive key IDs from key server' procedure 1109 waits to receive a key identification list from the key server 1005 (one skilled in the art will understand that there are many ways to allow other requests from serviced clients while at the same time waiting for responses from the key server 1005; these ways include, but are not limited to, instantiating separate threads for each request, maintaining status for each request, implementing a state machine, etc.). The key identification list identifies the collection of keys that were sent to the serviced client during by the client key collection transfer 1017.

Once the 'receive key IDs from key server' procedure 1109 receives the key identification list for this request, the service provider 1003 knows which keys are available to service the serviced client. Next, a 'select key ID from Key Set Intersection' procedure 1111 forms an intersection of key collections for all the clients that have requested the service and selects a key from that intersection. Thus, selecting a single key that is associated with each of clients that have requested the service.

When the key is selected a 'encrypt content and concatenate key' procedure 1113 encrypts the content associated with the requested service such that the selected key can be used to decrypt the content. The key identifier can be merged with the encrypted content. Next, a 'send content to client' procedure 1115 sends the merged content to the serviced client (the client operation is described with respect to FIG. 13 and FIG. 14). Then, the service provider thread 1100 returns to the 'receive client service request' procedure 1105 to service the next request.

In another embodiment, the key identifier and the encrypted content can be separately sent to the serviced client.

The audit client 1007 (that may be part of the key server 1005 or a separate system that has access to the partitioned key set information) can request service in the same manner as the serviced client 1001, but on receiving the key identification via its own selected key identifier transfer 1021, can infer the number of clients accessing the service using the previously discussed techniques. This is subsequently described with respect to FIG. 13, and FIG. 14.

In the case where serviced clients join the service while the service is being performed (for example, while an audio stream is being provided, the key used to encode the stream may need to be changed. In this case, all the serviced clients must be informed of the change of key identification. This notification can be done by ending the previous stream, merging the new key id with content encrypted with the new key, and transmitting the new stream to all the clients. Another method is to notify each of the serviced clients that a new key will be used after a particular point (such as the end of a song, or at a significant pause). Another approach is to limit the number of serviced clients to those that join prior to the start of the content stream. Finally, if the participant upper bound is approached (see the subsequent discussion of FIG. 12, and the previous discussion relating to $n_{max}$ above) the service provider must request a new key set from the key server.

The service provider thread 1100 interacts with the key server 1005 that is subsequently described with respect to FIG. 12; and the serviced client 1001 and the audit client 1007 as is subsequently described with respect to FIG. 13 and FIG. 14 respectively.

Figure 12:
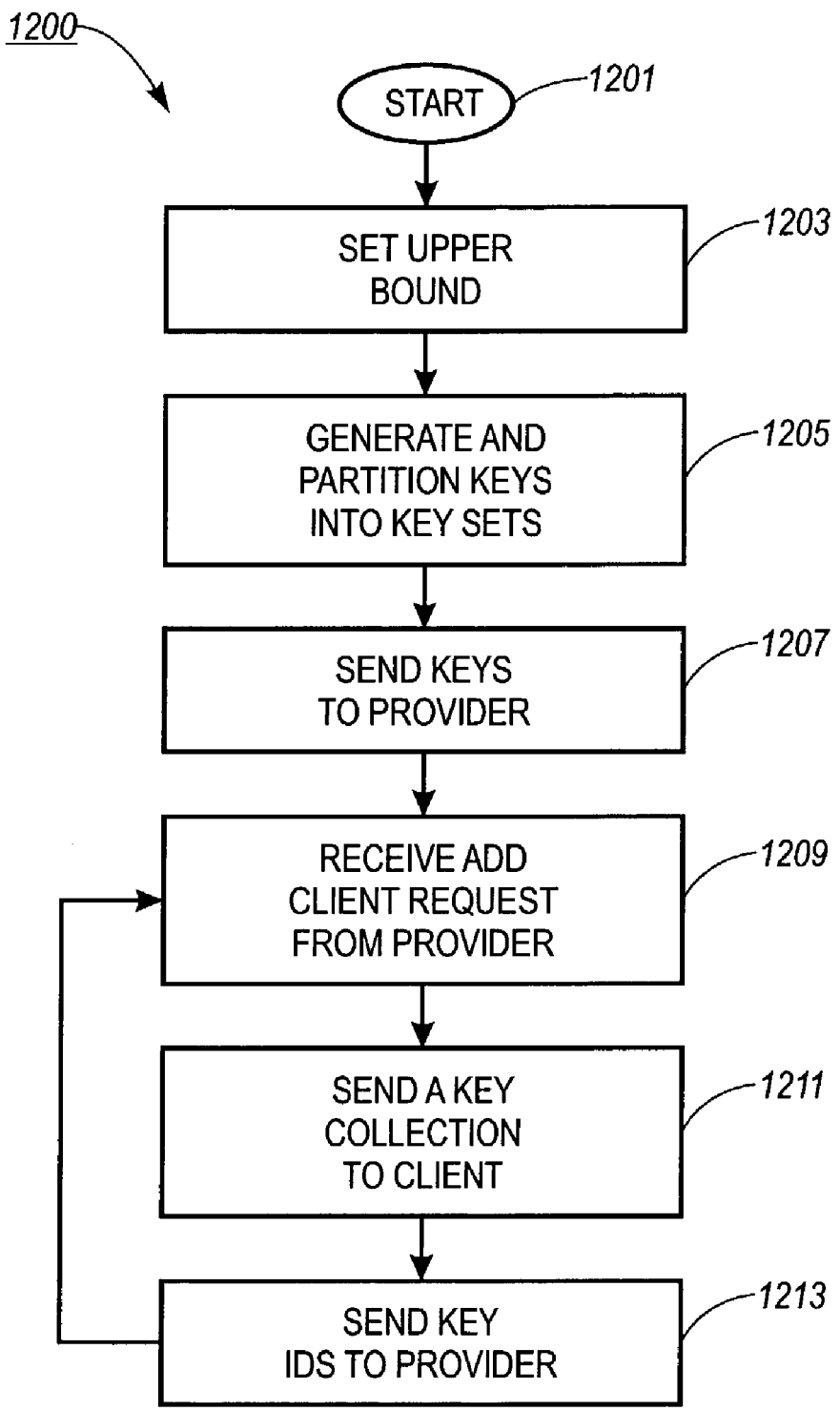
FIG. 12 illustrates a key server thread in accordance with the architecture of FIG. 10.

FIG. 12 illustrates a key server thread 1200 that can be used to implement the functions of the key server 1005. The key server thread 1200 initiates at a 'start' terminal 1201 and continues to a 'set upper bound' procedure 1203 that specifies the expected number of clients that will be requesting the service $n_{max}$. This parameter can be negotiated between the service provider and the service owner and represents the maximum expected number of participants during the time the key set remains static. If the number of service requests approaches $n_{max}$, the service provider can request a new key set. That a new key set has been requested can be reported to the service owner.

Once the upper bound of clients is established, a 'generate and partition keys' procedure 1205 generates and partitions sufficient keys in accordance to the previously described protocol resulting in allocating the generated keys into a number of key sets. Each of the key sets has a unique key set identification. Once the keys are created they are sent to the service provider 1003 by a 'send keys to the service provider' procedure 1207. At this point, the key server thread 1200 is ready to service the service provider 1003. Once the service provider 1003 receives a service request from a serviced client it forwards the request to the key server 1005 where it is received by the 'receive forwarded client request' procedure 1209 that verifies that the request is well formed. Next, the key server thread 1200 continues to a 'send key collection to client' procedure 1211 that selects keys from a key set for possible use by the serviced client, and sends them to the serviced client. Then, a 'send key identifications to service provider' procedure 1213 sends the key identification list to the service provider 1003 where it will be used as described in FIG. 11. The key server thread 1200 then returns to the 'receive forwarded client request' procedure 1209 to receive additional requests for service.

Figure 13:
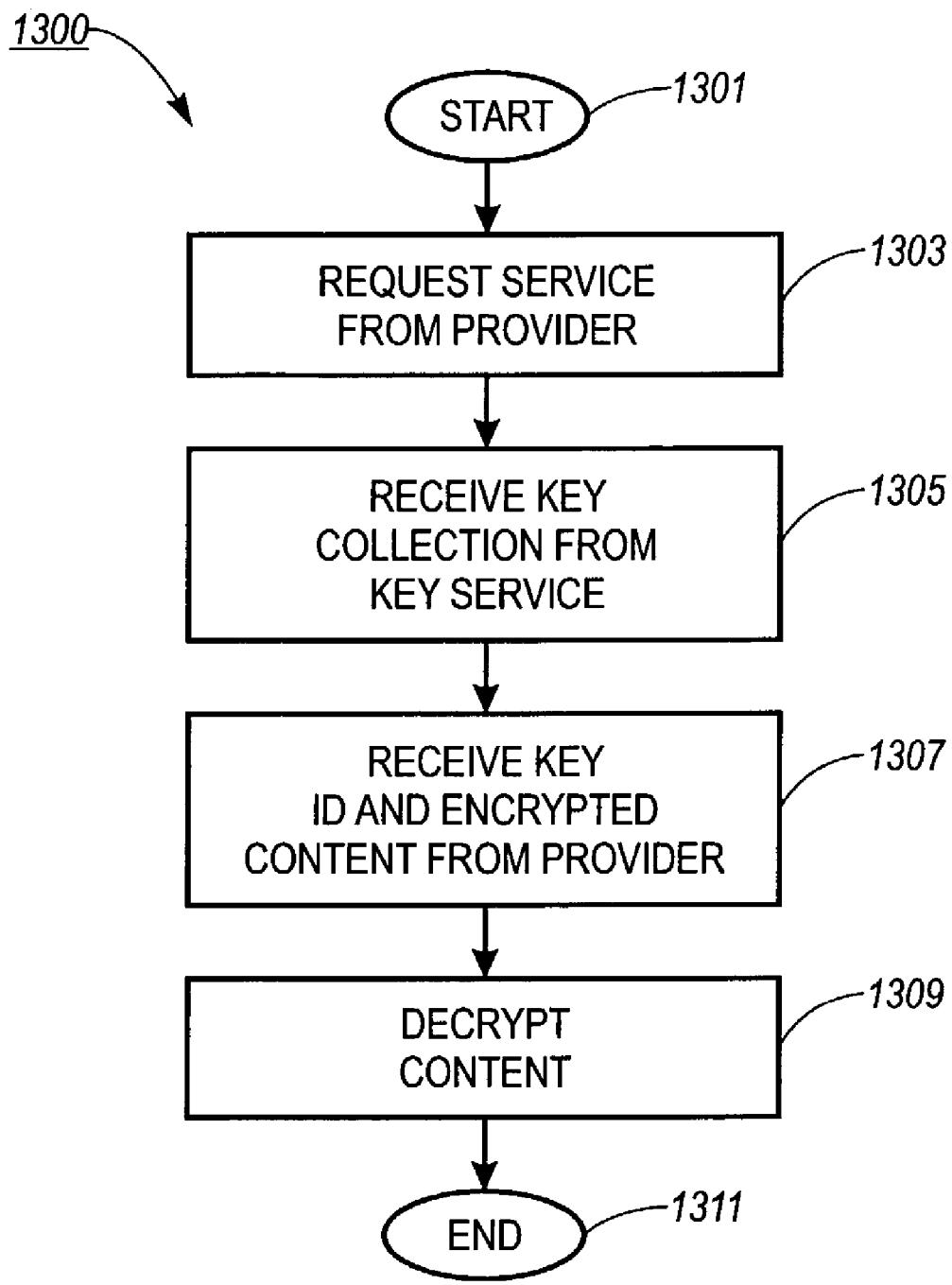
FIG. 13 illustrates a client thread in accordance with the architecture of FIG. 10.

FIG. 13 illustrates a client thread 1300 that runs in a serviced client 1001 and that initiates at a 'start' terminal 1301. The client thread 1300 continues to a 'request service from service provider' procedure 1303. The 'request service from service provider' procedure 1303 sends a request for a service to the service provider 1003 where it is received by the 'receive client service request' procedure 1105. Next, a 'receive key collection' procedure 1305 waits to receive a key collection sent by the 'send key collection to client' procedure 1211 of the key server 1005 and after receipt of the keys continues to a 'receive key identifier and encrypted content' procedure 1307 that waits to receive the key identification and encrypted content resulting from the service sent by the 'send content to client' procedure 1115 of the service provider 1003. Once the key identification is received, the content from the service can be decrypted by a 'decrypt content' procedure 1309 that uses the identified key and the client thread 1300 completes through an 'end' terminal 1311.

Figure 14:
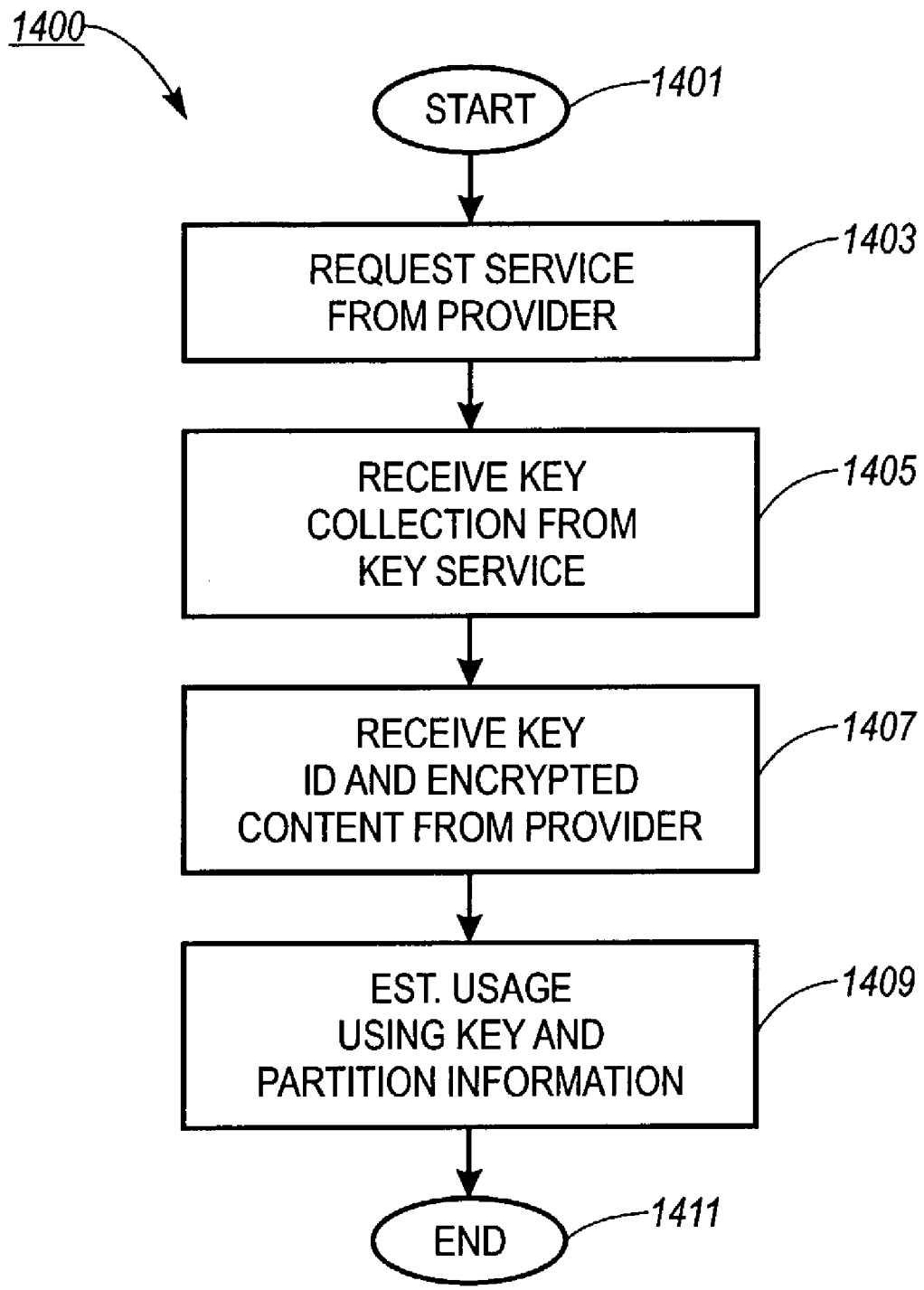
FIG. 14 illustrates an audit thread in accordance with the architecture of FIG. 10.

FIG. 14 illustrates an audit thread 1400 that runs in an audit client 1007 and that initiates at a 'start' terminal 1401. The audit thread 1400 continues to a 'request service from service provider' procedure 1403. The 'request service from service provider' procedure 1403 sends a request for a service to the service provider 1003 where it is received by the 'receive client service request' procedure 1105. Next, a 'receive key collection' procedure 1405 waits to receive a key collection sent by the 'send key collection to client' procedure 1211 of the key server 1005 and after receipt of the keys continues to a 'receive key identifier and encrypted content' procedure 1407 that waits to receive the key identification and encrypted content sent by the 'send content to client' procedure 1115 of the service provider 1003. Once the key identification is received, an 'estimate number of serviced client' procedure 1409 uses the techniques previously described with respect to with respect to the Second Protocol to infer the number of serviced clients that have accessed or are accessing the service. This inference uses the key identification received by the 'receive key identifier and encrypted content' procedure 1407 and knowledge of the key partitioning performed by the 'generate and partition keys' procedure 1205 at the key server 1005. The results of the 'estimate number of serviced client' procedure 1409 is logged or reported to the service provider. Finally, the audit thread 1400 completes through an 'end' terminal 1411.

The audit thread 1400 can also include capability like that of the 'decrypt content' procedure 1309 to actually perform the functions of the serviced client 1001 as well as the functions of the audit client 1007 to make it more difficult for the service provider 1003 to distinguish between the serviced client 1001 and the audit client 1007. One skilled in the art will understand that the steps 'start' terminal 1301 through 'receive key identifier and encrypted content' procedure 1307 can be identical to the steps 'start' terminal 1401 through 'receive key identifier and encrypted content' procedure 1407.

The key server 1005 can include the functionality of the audit client 1007 (such that the audit client can have more direct access to the information regarding the partitioning of the key sets). However, in some embodiments, the audit client 1007 can be a separate computer. In such an embodiment, the information regarding the partitioning of the key sets needs to be provided to the audit client 1007.

Figure 15:
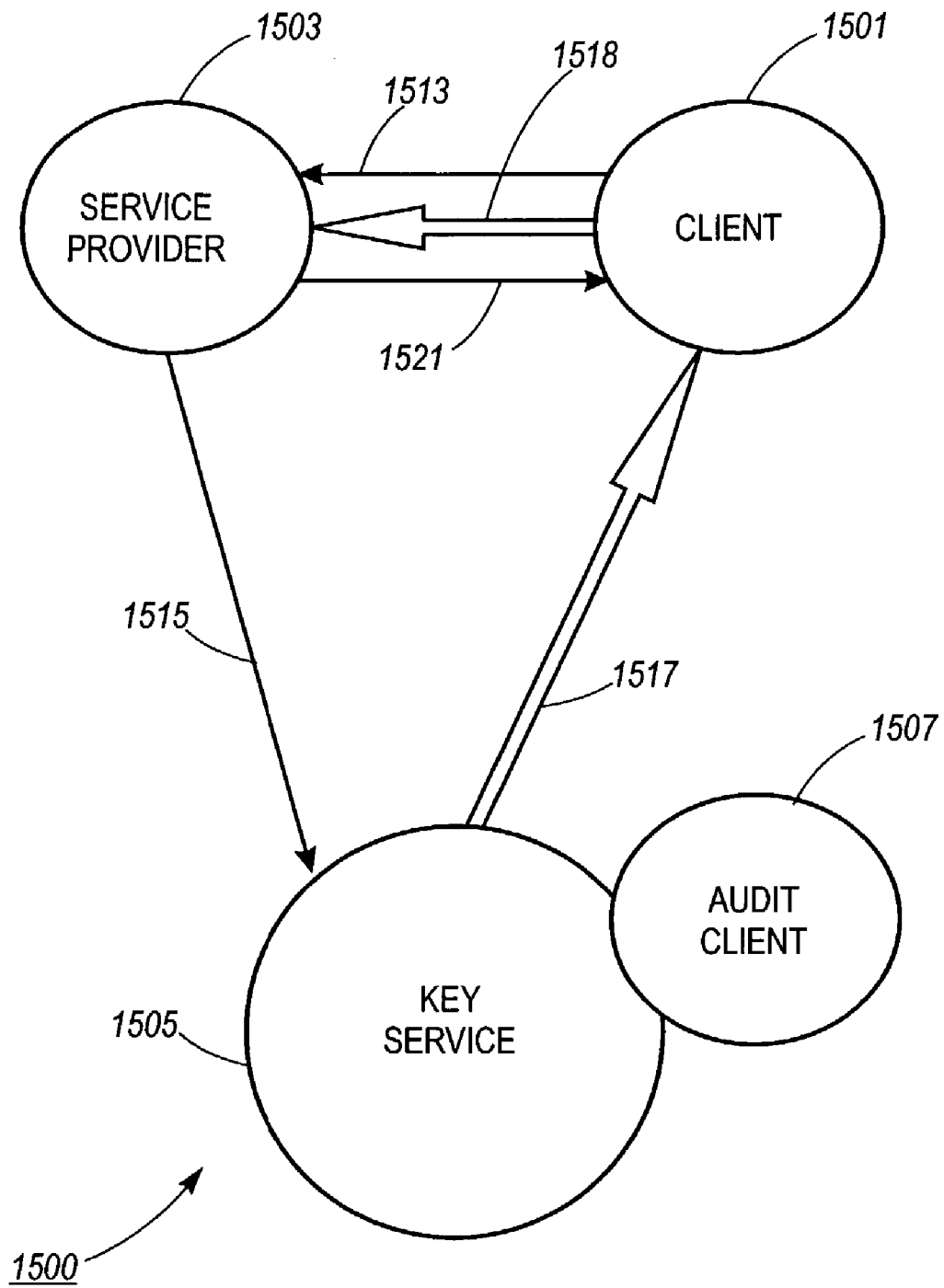
FIG. 15 illustrates a second system architecture of an embodiment.

FIG. 15 illustrates a second system architecture diagram 1500 showing a serviced client 1501, a service provider 1503, a key server 1505, and an audit client 1507. The key server 1505 generates a collection of keys and partitions them into sets (as per the previous discussion). To access the service provided by the service provider 1503, the serviced client 1501 sends a service request 1513 for a service provided by the service provider 1503 to the service provider 1503. The service provider 1503 receives the request and sends a forwarded service request 1515 to the key server 1505. The key server 1505 then selects a key set for the client and performs a client key collection transfer 1517 that transfers some the keys from the selected key set to the serviced client 1501. Once the serviced client 1501 receives the key set, it transforms the keys in the key collection and performs a provider key collection transfer 1518 that transfers the transformed key collection to the service provider 1503. Thus, as compared to the first system architecture diagram 1000, the second system architecture diagram 1500 does not necessarily present all of the keys to the service provider 1503, but instead incrementally adds to the keys known to the service provider 1503 as each serviced client 1501 makes requests for service. Once the transformed key collection is received from the serviced client 1501, the service provider 1503 then forms the intersection of all the key collections that have been distributed to the clients requesting the service and selects a key from within the intersection that can be used by all the serviced clients. The service provider 1503 then performs a key identifier transfer 1521 that sends the key identifier of the selected key to the serviced client 1501 that selects the identified key to gain access to the requested service. For example, if the requested service is a content transfer, the content can be encrypted using the key, the key identification can be accessibly merged (or separately sent) with the content, and when the serviced client receives the content, can extract the key identifier and access the identified key to decrypt the content.

One skilled in the art will understand that in some, less protected embodiments, the keys sent from the client to the provider need not be transformed.

The audit client 1507 (that may be part of the key server 1505 or a separate system that has access to the partitioned key set information) can request service in the same manner as the serviced client 1501, but on receiving the key identification via its own the key identifier transfer 1521, can infer the number of clients accessing the service using the previously discussed techniques.

One implementation of the second system architecture diagram 1500 is subsequently described with respect to FIG. 16, FIG. 17, FIG. 19, and FIG. 18.

Figure 16:
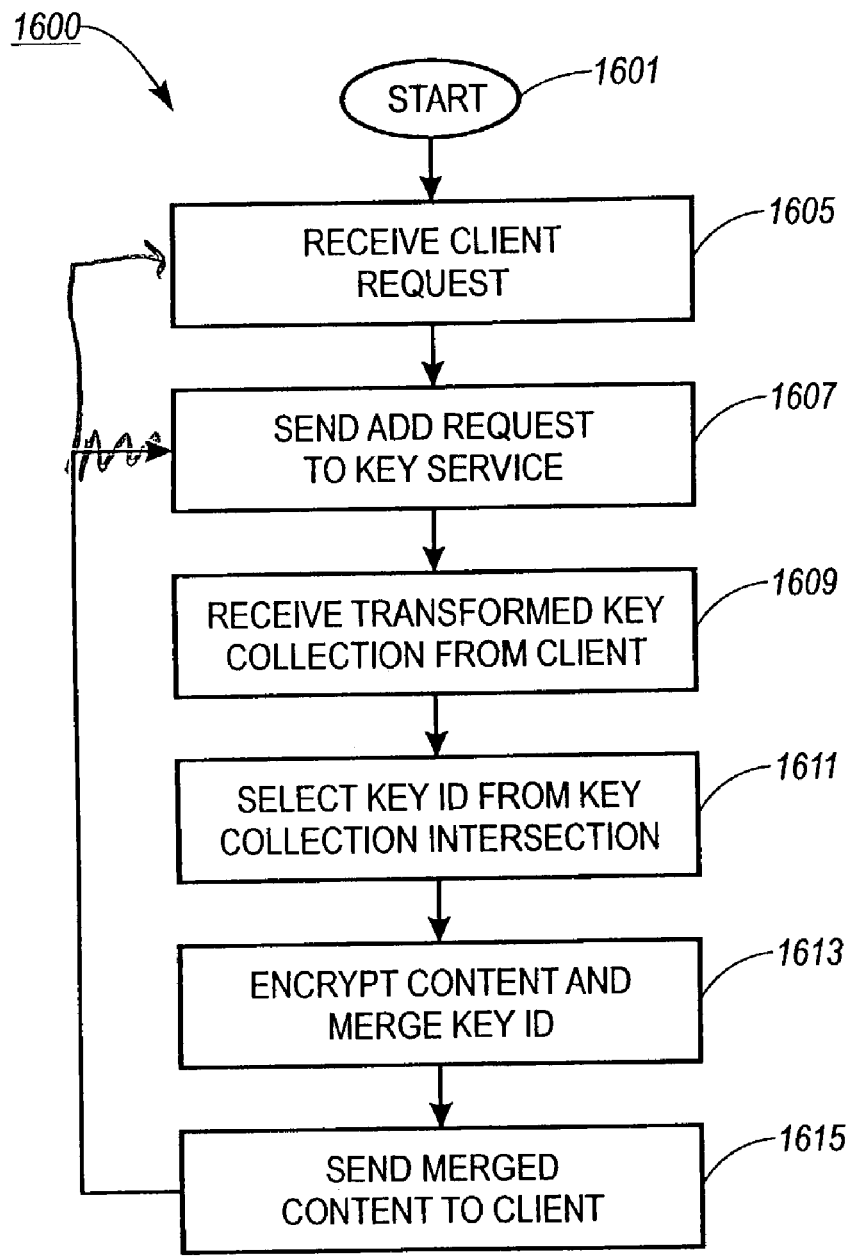
FIG. 16 illustrates a service provider thread in accordance with the architecture of FIG. 15.

FIG. 16 illustrates a service provider thread 1600 that runs in the service provider 1503 and provides a service to a number of serviced clients such as the serviced client 1501 and the audit client 1507. The service provider thread 1600 initiates at a 'start' terminal 1601 and continues to a 'receive client service request' procedure 1605. The 'receive client service request' procedure 1605 receives a request from a serviced client for a service, checks to determine that the request is well formed and saves information about the request for subsequent processing. Next, the service provider 1503 forwards the request to the key server 1505 using a 'send add request to key server' procedure 1607 and continues to a 'receive key collection from client' procedure 1609. The 'receive key collection from client' procedure 1609 waits to receive a key collection (possibly not transformed) from the serviced client 1501 (one skilled in the art will understand that there are many ways to allow other requests from serviced clients while at the same time waiting for responses from a particular client; these ways include, but are not limited to, instantiating separate threads for each request, maintaining status for each request, implementing a state machine, etc.).

Once the 'receive key collection from client' procedure 1609 receives the key collection for this request, the service provider 1503 has the keys that can be used to service the serviced client 1501. Next, a 'select key ID from key collection intersection' procedure 1611 forms an intersection of key collections for all the clients that have requested the service and selects a key from that intersection. Thus, the service provider selects a single key that is associated with each of the serviced clients. Once the key is selected a 'merge key ID with encrypted content' procedure 1613 encrypts the content associated such that the selected key can be used to decrypt the content. The key identifier can be merged with the encrypted content. Next, a 'send content to client' procedure 1615 sends the merged content to the serviced client (the client operation is described with respect to FIG. 13 and FIG. 14). Then, the service provider thread 1600 returns to the 'receive client service request' procedure 1605 to service the next request.

Figure 17:
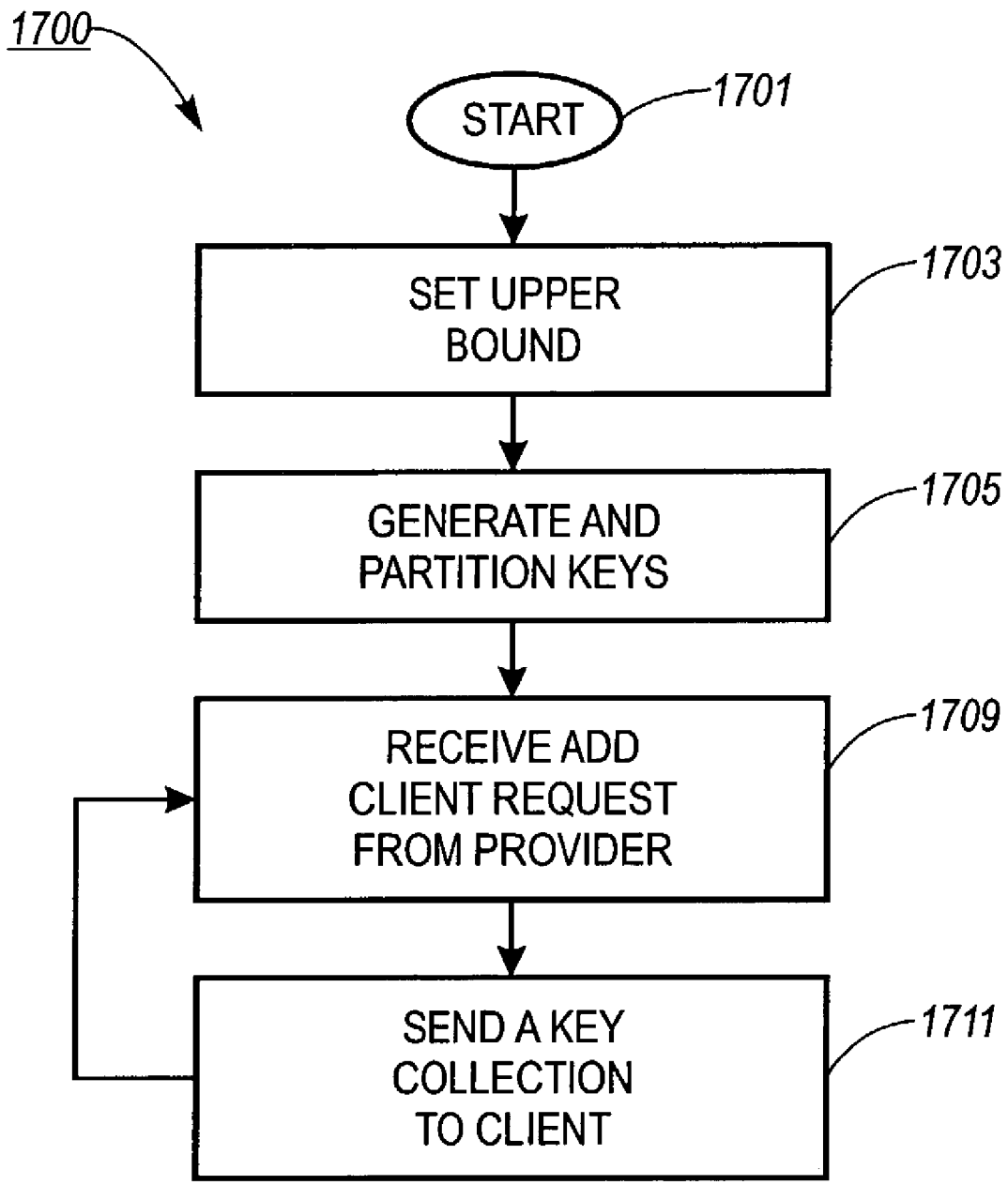
FIG. 17 illustrates a key server thread in accordance with the architecture of FIG. 15.

FIG. 17 illustrates a key server thread 1700 that can be used to implement the functions of the key server 1505. The key server thread 1700 initiates at a 'start' terminal 1701 and continues to a 'set upper bound' procedure 1703 that specifies the expected number of clients that will be requesting the service. This number can be negotiated between the service provider and the service owner. As in the embodiment described with respect to FIG. 10, there are multiple ways to address setting and resetting $n_{max}$.

Once the upper bound of clients is established, a 'generate and partition keys' procedure 1705 generates and partitions sufficient keys in accordance to the previously described protocol resulting in allocating the generated keys into a number of key sets. Each of the key sets can have a unique key set identification. At this point, the key server thread 1700 is ready to service the service provider 1503. Once the service provider 1503 receives a service request from a serviced client it forwards the request to the key server 1505 where it is received by the 'receive forwarded client request' procedure 1709 that verifies the request is well formed. Next, the key server thread 1700 continues to a 'send key collection to client' procedure 1711 that selects a collection of keys from a key set for use by the client, and sends the collection to the client. The key server thread 1700 then returns to the 'receive forwarded client request' procedure 1709 to receive additional requests for service.

Figure 18:
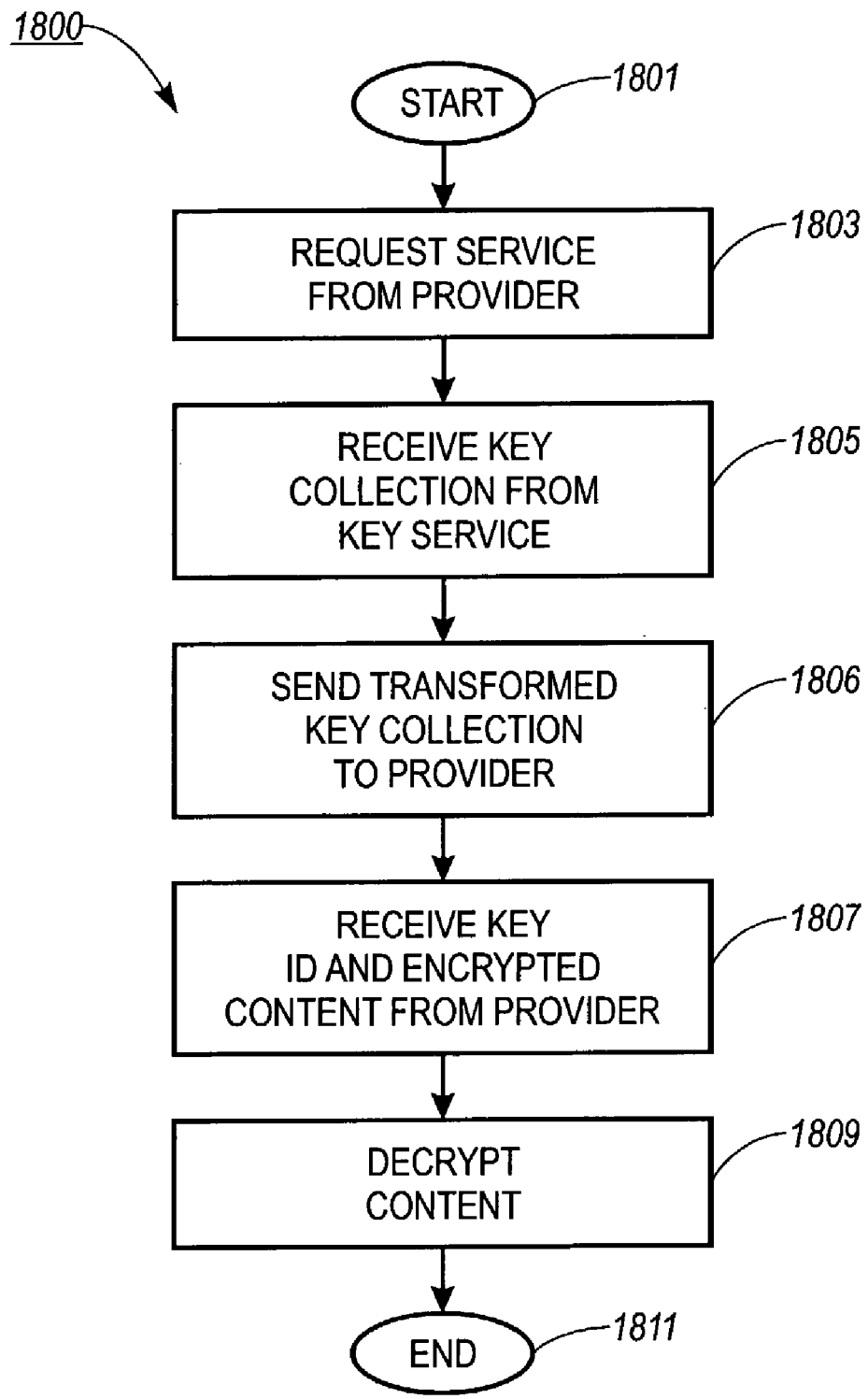
FIG. 18 illustrates a client thread in accordance with the architecture of FIG. 15.

FIG. 18 illustrates a client thread 1800 that runs in a serviced client 1001 and that initiates at a 'start' terminal 1801. The client thread 1800 continues to a 'request service from service provider' procedure 1803. The 'request service from service provider' procedure 1803 sends a request for a service to the service provider 1503 where it is received by the 'receive client service request' procedure 1605. Next, a 'receive key collection' procedure 1805 waits to receive a key set sent by the 'send key collection to client' procedure 1711 of the key server 1505 and after receipt of the keys continues to a 'send transformed key collection to provider' procedure 1806 that transforms the keys in the key collection received by the 'receive key collection' procedure 1805 and sends the transformed key collection to the service provider 1503 where the keys are received by the 'receive key collection from client' procedure 1609. Next the client thread 1800 continues to a 'receive key identifier and encrypted content' procedure 1807 that waits to receive the key identification and encrypted content resulting from the service sent by the 'send content to client' procedure 1615 of the service provider 1503. Once the key identification is received, the content from the service can be decrypted by a 'decrypt content' procedure 1809 using the identified key and the client thread 1800 completes through an 'end' terminal 1811.

Figure 19:
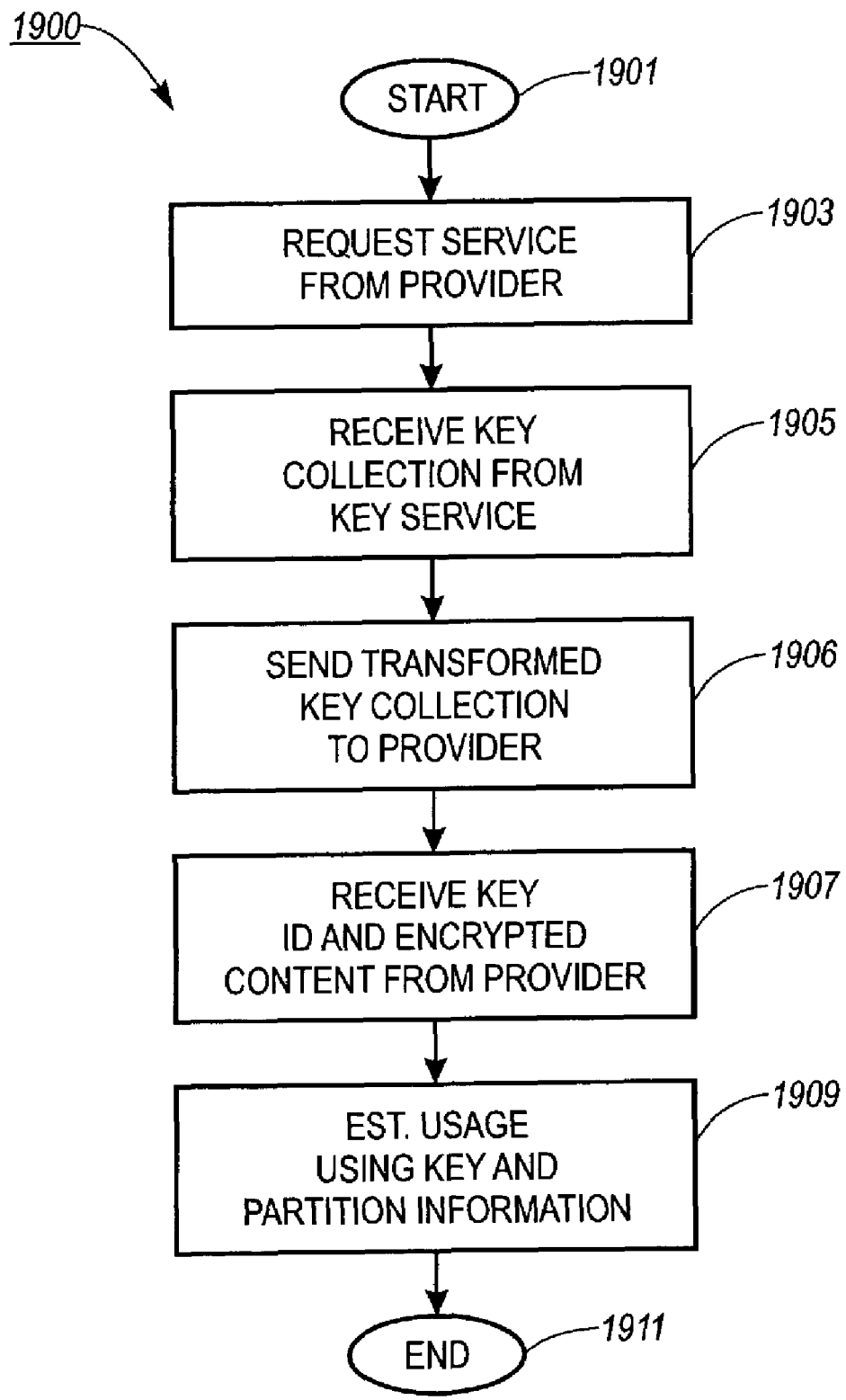
FIG. 19 illustrates an audit thread in accordance with the architecture of FIG. 15.

FIG. 19 illustrates an audit thread 1900 that runs in an audit client 1507 and that initiates at a 'start' terminal 1901. The audit thread 1900 continues to a 'request service from service provider' procedure 1903. The 'request service from service provider' procedure 1903 sends a request for a service to the service provider 1503 where it is received by the 'receive client service request' procedure 1605. Next, a 'receive key collection' procedure 1905 waits to receive a key set sent by the 'send key collection to client' procedure 1711 of the key server 1505 and after receipt of the keys continues to a 'send transformed key collection to provider' procedure 1906 that transforms the keys in the key collection received by the 'receive key collection' procedure 1905 and sends the transformed key collection to the service provider 1503 where the keys are received by the 'receive key collection from client' procedure 1609, Next, the audit thread 1900 continues to a 'receive key identifier and encrypted content' procedure 1907 that waits to receive the key identification and encrypted content resulting from the service sent by the 'send content to client' procedure 1615 of the service provider 1503.

Once the key is received, an 'estimate number of serviced client' procedure 1909 uses the techniques previously described with respect to the Second Protocol to infer the number of serviced clients that have (are) accessing the service. This inference uses the key received by the 'receive key identifier and encrypted content' procedure 1907 and knowledge of the key partitioning performed by the 'generate and partition keys' procedure 1705 at the key server 1505. Finally, the audit thread 1900 completes through an 'end' terminal 1911.

The audit thread 1900 can also include capability like that of the 'decrypt content' procedure 1809 to actually perform the functions of the serviced client 1501 as well as the functions of the audit client 1507 to make it more difficult for the service provider 1503 to distinguish between the serviced client 1501 and the audit client 1507.

The key server 1505 can include the functionality of the audit client 1507 (such that the audit client can have more direct access to the information regarding the partitioning of the key sets). However, in some embodiments, the audit client 1507 can be a separate computer. In such an embodiment, the information regarding the partitioning of the key sets needs to be provided to the audit client 1507.

In another embodiment, the key identifier and the encrypted content can be separately sent to the serviced client.

Note that the second protocol is not completely privacy preserving because the auditor learns something about the clients, namely, that they have key k. However, if there is sufficient separation between the auditor and the key server it will be difficult for the auditor to make use of this information. In addition, we note that it may be possible to use this aspect of the scheme to embed demographic information. For example, although men and women should with high probability receive the same number of keys in $S_i$, the particular keys they tend to receive may be partly a function of their sex. Hence, the auditor may be able to infer the predominant sex of the audience from the content distributor's choice of encryption key in $S_i$.

The protocol described above is best suited to estimate cumulative audience size, for example, the number of hits received by a web site over a certain period of time. In some settings, this may be the only possible measure of audience size. For example, in multicast applications, the content distributor typically only is informed of new additions to the multicast group and is unlikely to know when a member leaves. Hence, by observing the service provider's behavior, or by querying directly, it may only be possible to learn the cumulative audience. In this case, behavioral patterns may be used to infer current audience size from cumulative data It is also be possible to modify the second protocol to measure audience size directly. Note that if the auditor can observe the content for long enough to gain an accurate estimate of the entire contents of T, then the auditor can infer the current audience. The entire contents of T are necessary because the service provider gains some ability to distinguish keys from every new serviced client. For example, if k is stored by several clients but k' is only known to a few, then k' may be a cheaper key for the service provider to use because it may imply a smaller audience in the basic protocol ($k' \epsilon S_i$, $k \epsilon S_j$, where i<j). Hence, if the audience shrinks and k' ends up being a key all the current clients know, the content distributor may seek to mislead the auditor by only using k'. However, if the service provider is required to change keys frequently (e.g., a different key for every few songs) and the auditor listens long enough to determine that k' is the only key in use, an alarm can be raised because of the very low the probability that the content distributor would be left with only k' at some point is very low. One potential problem with this is that it doesn't guarantee access control because a key that is known to clients who are no longer considered to be in the audience may be selected as the encryption key.

One skilled in the art will understand that the network transmits information (such as the previously described data as well as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer usable data carrier.

One skilled in the art will understand that there are many equivalent ways this protocol can be implemented. These ways include using object-oriented programming methodologies as well as procedural programming methodologies.

In addition, the flowcharts provided herein are for illustrative purposes and are used to teach one embodiment of the invention. Other flowcharts that incorporate the underlying theory (or modifications thereof) are to be considered as equivalent.

One skilled in the art will understand that one aspect of the invention provides an accurate, low-overhead determination of the number of times a service is provided.

From the foregoing, it will be appreciated that aspects of the invention have (without limitation) the following advantages: the invention
1) provides a low overhead method for determining the usage of a service;
2) provides an accurate determination of the usage of the service;
3) preserves the anonymity of the clients serviced;
4) audits a service provider's compliance with the protocol;
5) is secure against deflation of the service usage;
6) (in some embodiments) is secure against inflation of the service usage.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method comprising:
providing, by a service provider, a service responsive to one or more service requests from one or more of a plurality of serviced clients,
wherein the plurality of serviced clients including an audit client which audits the services provided by the service provider, and the service provider maintains a Bloom filter which is a bit-vector of length m; and
wherein the service requests include a plurality of audit client requests, by the audit client, to the service provider;
negotiating, between the service provider and the one or more requesting clients in the plurality of serviced clients, one or more service request tags which represent the one or more service requests, wherein the service request tags include audit client tags associated with the audit client request;
inserting the service request tags associated with the one or more service requests into the Bloom filter, wherein inserting a tag into the Bloom filter involves:
inputting the tag into a set of hash functions associated with the Bloom filter;
generating a set of bit positions based on the outputs of the set of hash functions; and
setting the bits corresponding to the generated bit positions in the Bloom filter;
sending the Bloom filter from the service provider to the audit client;
computing an estimated number of the one or more serviced requests, by the audit client, based on the Bloom filter which contains both the service request tags and the audit client tags, wherein computing the number of serviced requests by the audit client prevents the service provider from cheating.

2. The method of claim 1, wherein the step of inserting is performed over an interval and the step of computing determines said number with respect to said interval.

3. The method of claim 2, wherein the audit client maintains the audit client tags throughout said interval.

4. The method of claim 1, wherein the audit client tags are represented by a bit vector.

5. The method of claim 1, further comprising verifying that the plurality of audit client tags were recognized in the Bloom filter.

6. The method of claim 1, wherein said service is that of providing content, providing software, utilization of a resource, usage of a program, usage of a database, or access to a service where an owner of said service desires to know the amount the service is used.

7. The method of claim 1, wherein said service provider is obligated to measure how much the service is used.

8. A system comprising:
a service provider mechanism programmed to provide a service responsive to one or more service requests from one or more of a plurality of serviced clients,
wherein the plurality of serviced clients including an audit client which audits the services provided by the service provider, and the service provider maintains a Bloom filter which is a bit-vector of length m and
wherein the service requests include a plurality of audit client requests, by the audit client, to the service provider;
a negotiation mechanism that negotiates a service request tag for each of the one or more service requests between the service provider and the one or more requesting clients in the plurality of serviced clients
wherein the service request tags include audit client tags associated with the audit client request;
an insertion mechanism that inserts the service request tags associated with the one or more service requests into the Bloom filter, wherein inserting a tag into the Bloom filter involves:
inputting the tag into a set of hash functions associated with the Bloom filter;
generating a set of bit positions based on the outputs of the set of hash functions; and
setting the bits corresponding to the generated bit positions in the Bloom filter;
a sending mechanism that sends the Bloom filter from the service provider to the audit client;
wherein the audit client is programmed to compute an estimated number of the one or more requests serviced based on the Bloom filter which contains both the service request tags and the audit client tags,
wherein computing the number of serviced requests by the audit client prevents the service provider from cheating.

9. The system of claim 8, wherein the insertion mechanism operates over an interval and the computing mechanism determines said number with respect to said interval.

10. The system of claim 9, wherein, the audit client maintains the audit client tags throughout said interval.

11. The system of claim 8, wherein the audit client tags are represented by is a bit vector.

12. The system of claim 8, further comprising a verification mechanism programmed to verify that the plurality of audit client tags were recognized in the Bloom filter.

13. The system of claim 8, wherein the service provider provides content, software, utilization of a resource, usage of a program, usage of a database, or access to a service where an owner of said service desires to know the amount the service is used.

14. The system of claim 8, wherein said service provider is obligated to measure how much the service is used.

15. A method comprising:
providing, by a service provider, a service responsive to one or more service requests from one or more of a plurality of serviced clients, wherein the service provider maintains a Bloom filter which is a bit-vector of length m,
negotiating a tag which represents a service request for each of the one or more service requests;
inserting the tags associated with the one or more service requests into the Bloom filter, wherein inserting a tag into the Bloom filter involves:
inputting the tag into a set of hash functions associated with the Bloom filter;
generating a set of bit positions based on the outputs of the set of hash functions; and
setting the bits corresponding to the generated bit positions in the Bloom filter; and providing the Bloom filter representation of the negotiated tags.

16. The method of claim 15, wherein the step of inserting extends over an interval.

17. The method of claim 15, wherein the step of negotiating negotiates with a serviced client.

18. The method of claim 15, wherein the step of providing provides the Bloom filter representation of tags to an audit client.

19. The method of claim 18, wherein the one or more requests include requests sent by the audit client.

20. The method of claim 15, wherein the tags are represented by a bit vector.

21. The method of claim 20, wherein each tag is a nonce.

22. The method of claim 15, wherein said service is that of providing content, providing software, utilization of a resource, usage of a program, usage of a database, or access to a service where an owner of said service desires to know the amount the service is used.

23. An apparatus comprising:
a network interface;
a receiver mechanism that receives, using the network interface, one or more requests for a service,
a negotiation mechanism, responsive to the receiver mechanism, that negotiates a tag which represents a service request for each of the one or more service requests;
a tag inserting mechanism programmed to inserting the tag into a Bloom filter, wherein inserting a tag into the Bloom filter involves:
inputting the tag into a set of hash functions associated with the Bloom filter;
generating a set of bit positions based on the outputs of the set of hash functions; and
setting the bits corresponding to the generated bit positions in the Bloom filter; and
a transmission mechanism that provides, using the network interface, the Bloom filter representation of the negotiated tags.

24. The apparatus of claim 23, wherein the tag inserting mechanism operates over an interval.

25. The apparatus of claim 23, wherein the negotiation mechanism negotiates with a serviced client.

26. The apparatus of claim 23, wherein the transmission mechanism is programmed to provide the Bloom filter containing the tags to an audit client.

27. The apparatus of claim 26, the one or more requests include requests sent by the audit client.

28. The apparatus of claim 23, wherein the tags are represented by a bit vector.

29. The apparatus of claim 28, wherein each tag is a nonce.

30. The apparatus of claim 23, wherein said service provided is that of providing content, providing software, utilization of a resource, usage of a program, usage of a database, or access to a service where an owner of said service desires to know the amount the service is used.

31. A method comprising:
sending a plurality of audit client requests, by an audit client, to a service provider;
negotiating a tag for each of the plurality of audit client requests, wherein the audit client maintains a copy of the negotiated tag;

inserting the negotiated tags into a Bloom filter, wherein inserting a tag into the Bloom filter involves:
  inputting the tag into a set of hash functions associated with the Bloom filter;
  generating a set of bit positions based on the outputs of the set of hash functions; and
  setting the bits corresponding to the generated bit positions in the Bloom filter;
sending the Bloom filter from the service provider to the audit client; and
computing an estimated number of one or more requests serviced by the service based on the Bloom filter which contains the negotiated tags, wherein computing the number of serviced requests by the audit client prevents the service provider from cheating.

32. The method of claim 31, further comprising verifying from the Bloom filter that the plurality of audit client requests were recognized.

33. An apparatus comprising:
a network interface;
a transmission mechanism that sends, using the network interface, a plurality audit client requests to a service provider;
a negotiation mechanism that negotiates a tag for each of the plurality audit client requests with the service provider;
bloom filter programmed to maintain the audit client tags negotiated by the negotiation mechanism;
a reception mechanism that receives, using the network interface, the Bloom filter from the service provider; and
an estimation mechanism programmed to estimate a number of one or more requests serviced by the service provider based on the Bloom filter which contains the negotiated tags.

34. The apparatus of claim 33, further comprising a checking mechanism configured to verify from the Bloom filter that the plurality of audit client requests were recognized by the service provider.

35. The apparatus of claim 33, further comprising a reporting mechanism configured to report said number.

* * * * *